US012591914B2

(12) United States Patent
Copeland et al.

(10) Patent No.: US 12,591,914 B2
(45) Date of Patent: Mar. 31, 2026

(54) REAL-TIME COLLATERAL RECOMMENDATION

(71) Applicant: Accenture Global Solutions Limited, Dublin (IE)

(72) Inventors: Shannon Copeland, Atlanta, GA (US); Burton M. Smith, III, Panama City Beach, FL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 189 days.

(21) Appl. No.: 18/111,043

(22) Filed: Feb. 17, 2023

(65) Prior Publication Data

US 2023/0274322 A1　　Aug. 31, 2023

Related U.S. Application Data

(60) Provisional application No. 63/313,820, filed on Feb. 25, 2022.

(51) Int. Cl.
| | | |
|---|---|---|
| *G06Q 30/02* | (2023.01) | |
| *H04L 51/02* | (2022.01) | |
| *H04M 3/51* | (2006.01) | |

(52) U.S. Cl.
CPC .......... *G06Q 30/0281* (2013.01); *H04L 51/02* (2013.01); *H04M 3/5166* (2013.01); *H04M 3/5183* (2013.01)

(58) Field of Classification Search
CPC ......................... G06Q 30/0281; G06Q 30/016
See application file for complete search history.

(56) References Cited

U.S. PATENT DOCUMENTS

| | | | |
|---|---|---|---|
| 6,785,380 | B2 | 8/2004 | Ribera |
| 6,829,603 | B1 | 12/2004 | Chai et al. |

(Continued)

FOREIGN PATENT DOCUMENTS

| | | | | |
|---|---|---|---|---|
| JP | 7616805 | B2 * | 1/2025 | .......... G06V 10/776 |
| KR | 1020180058877 | | 7/2018 | |

(Continued)

OTHER PUBLICATIONS

Multi agent recommendation and sentiment analysis in CRM (Year: 2020).*

(Continued)

*Primary Examiner* — Sangeeta Bahl
(74) *Attorney, Agent, or Firm* — MANNAVA & KANG, P.C.

(57) ABSTRACT

Methods, systems and products for real-time collateral recommendation for business development representatives ('BDR') is presented, including receiving communications between a BDR and a customer across disparate communications channels, each channel comprising a channel type, channel communications protocol, and channel form. Embodiments include normalizing the disparate communications in dependence upon normalization rules, synchronizing the disparate communications in dependence upon a set of rules appropriate to the end task including an occurrence of the disparate communications in time order, summarizing the normalized communications in dependence upon summarization rules, creating semantic triples in dependence upon the summarized and normalized communications including applying a sales-directed taxonomy and ontology; identifying one or more insights in dependence upon the semantic triples; and selecting, in real-time in dependence upon the identified insights, real time collateral for the BDR related to the communications between the (Continued)

BDR and the customer; and presenting the selected real-time collateral to the BDR.

18 Claims, 8 Drawing Sheets

(56) References Cited

U.S. PATENT DOCUMENTS

| | | | |
|---|---|---|---|
| 7,275,083 B1 | 9/2007 | Seibel et al. | |
| 7,486,785 B2 | 2/2009 | Flores | |
| 8,108,237 B2 | 1/2012 | Bourne et al. | |
| 8,332,279 B2 | 12/2012 | Woolston | |
| 8,352,301 B1* | 1/2013 | Starr | G06Q 10/00 |
| | | | 705/7.29 |
| 8,411,843 B1 | 4/2013 | Cyriac | |
| 9,049,295 B1 | 6/2015 | Cooper | |
| 9,165,556 B1 | 10/2015 | Sugar | |
| 9,848,082 B1 | 12/2017 | Lilland | |
| 9,860,391 B1 | 1/2018 | Wu et al. | |
| 9,936,066 B1 | 4/2018 | Mammen et al. | |
| 9,942,779 B1 | 4/2018 | Proctor | |
| 9,948,783 B1 | 4/2018 | Farrell | |
| 10,026,092 B2 | 7/2018 | Heater et al. | |
| 10,057,423 B1 | 8/2018 | Sheikh | |
| 10,101,976 B2 | 10/2018 | Cavalcante | |
| 10,303,466 B1 | 5/2019 | Karman | |
| 10,482,384 B1 | 11/2019 | Stoilos | |
| 10,943,072 B1* | 3/2021 | Jaganmohan | G06N 5/041 |
| 11,184,306 B1 | 11/2021 | Angeli et al. | |
| 11,367,080 B2* | 6/2022 | Konig | H04M 3/5191 |
| 11,797,586 B2 | 10/2023 | Copeland | |
| 2003/0069780 A1 | 4/2003 | Hailwood et al. | |
| 2003/0126136 A1 | 7/2003 | Omoigui | |
| 2004/0143473 A1 | 7/2004 | Tivey et al. | |
| 2004/0210881 A1 | 10/2004 | Friedman | |
| 2005/0005266 A1 | 1/2005 | Datig | |
| 2005/0044357 A1 | 2/2005 | Fano | |
| 2005/0105712 A1 | 5/2005 | Williams et al. | |
| 2006/0095273 A1 | 5/2006 | Montvay et al. | |
| 2006/0098625 A1 | 5/2006 | King | |
| 2006/0239439 A1 | 10/2006 | Blackwood | |
| 2007/0019618 A1 | 1/2007 | Shaffer | |
| 2007/0064913 A1 | 3/2007 | Shaffer | |
| 2007/0094183 A1 | 4/2007 | Paek et al. | |
| 2007/0233561 A1 | 10/2007 | Golec | |
| 2007/0233730 A1 | 10/2007 | Johnston | |
| 2008/0162498 A1 | 7/2008 | Omoigui | |
| 2008/0275744 A1 | 11/2008 | MacIntyre et al. | |
| 2009/0070322 A1 | 3/2009 | Salvetti | |
| 2009/0132474 A1 | 5/2009 | Ma | |
| 2009/0245500 A1 | 10/2009 | Wampler | |
| 2009/0271192 A1 | 10/2009 | Marquette | |
| 2010/0010802 A1 | 1/2010 | Ruano | |
| 2010/0036788 A1 | 2/2010 | Wu | |
| 2010/0063799 A1 | 3/2010 | Jamieson | |
| 2010/0104087 A1 | 4/2010 | Byrd et al. | |
| 2010/0114563 A1 | 5/2010 | Choi | |
| 2011/0077999 A1 | 3/2011 | Becker et al. | |
| 2011/0082829 A1 | 4/2011 | Kolovski | |
| 2011/0113094 A1 | 5/2011 | Chunilal | |
| 2011/0206198 A1 | 8/2011 | Freedman | |
| 2011/0264451 A1 | 10/2011 | Hoepfinger | |
| 2012/0059776 A1 | 3/2012 | Estes | |
| 2012/0078636 A1 | 3/2012 | Ferrucci | |
| 2012/0197631 A1 | 8/2012 | Ramani et al. | |
| 2012/0233558 A1 | 9/2012 | Naim | |
| 2012/0275642 A1 | 11/2012 | Aller | |
| 2012/0303355 A1 | 11/2012 | Liu et al. | |
| 2013/0006916 A1 | 1/2013 | McBride | |
| 2013/0091090 A1 | 4/2013 | Spivack et al. | |
| 2013/0103735 A1 | 4/2013 | Dowling | |
| 2013/0163731 A1 | 6/2013 | Yan | |
| 2013/0204663 A1 | 8/2013 | Kahlow | |
| 2013/0262501 A1 | 10/2013 | Kuchmann-Beauger et al. | |
| 2014/0022328 A1 | 1/2014 | Gechter et al. | |
| 2014/0081585 A1 | 3/2014 | Cappucino et al. | |
| 2014/0081934 A1 | 3/2014 | Mizell | |
| 2014/0122535 A1 | 5/2014 | Gerard | |
| 2014/0164502 A1 | 6/2014 | Khodorenko | |
| 2014/0189680 A1 | 7/2014 | Kripalani | |
| 2014/0201234 A1 | 7/2014 | Lee et al. | |
| 2014/0270108 A1 | 9/2014 | Riahi et al. | |
| 2014/0278343 A1 | 9/2014 | Tran | |
| 2014/0314225 A1 | 10/2014 | Riahi | |
| 2014/0372630 A1 | 12/2014 | Bostick | |
| 2014/0379755 A1 | 12/2014 | Kuriakose | |
| 2015/0012350 A1 | 1/2015 | Li et al. | |
| 2015/0066479 A1 | 3/2015 | Pasupalak | |
| 2015/0112756 A1 | 4/2015 | Subramanian et al. | |
| 2015/0170163 A1 | 6/2015 | Wagner et al. | |
| 2015/0189085 A1 | 7/2015 | Riahi et al. | |
| 2015/0201077 A1 | 7/2015 | Konig et al. | |
| 2015/0242410 A1 | 8/2015 | Pattabhiraman et al. | |
| 2015/0254234 A1 | 9/2015 | Dixit et al. | |
| 2015/0261743 A1 | 9/2015 | Sengupta | |
| 2015/0294405 A1 | 10/2015 | Hanson | |
| 2015/0309994 A1 | 10/2015 | Liu | |
| 2015/0348551 A1 | 12/2015 | Gruber | |
| 2015/0379603 A1 | 12/2015 | Gupta | |
| 2016/0019882 A1 | 1/2016 | Matula | |
| 2016/0021181 A1 | 1/2016 | Ianakiev et al. | |
| 2016/0034457 A1 | 2/2016 | Bradley | |
| 2016/0036981 A1 | 2/2016 | Hollenberg | |
| 2016/0036982 A1 | 2/2016 | Ristock | |
| 2016/0036983 A1 | 2/2016 | Korolev | |
| 2016/0117593 A1 | 4/2016 | London | |
| 2016/0125364 A1 | 5/2016 | Field et al. | |
| 2016/0162474 A1 | 6/2016 | Agarwal | |
| 2016/0162913 A1 | 6/2016 | Linden et al. | |
| 2016/0171099 A1 | 6/2016 | Lorge et al. | |
| 2016/0171511 A1 | 6/2016 | Goel et al. | |
| 2016/0188686 A1 | 6/2016 | Hopkins | |
| 2016/0189028 A1 | 6/2016 | Hu et al. | |
| 2016/0217479 A1 | 7/2016 | Kashyap et al. | |
| 2016/0232540 A1 | 8/2016 | Gao et al. | |
| 2016/0239851 A1 | 8/2016 | Tanner | |
| 2016/0321748 A1 | 11/2016 | Mahatm | |
| 2016/0335544 A1 | 11/2016 | Bretschneider et al. | |
| 2017/0006135 A1 | 1/2017 | Siebel et al. | |
| 2017/0017694 A1 | 1/2017 | Roytman et al. | |
| 2017/0024375 A1 | 1/2017 | Hakkani-Tur | |
| 2017/0091390 A1 | 3/2017 | Joul | |
| 2017/0124193 A1 | 5/2017 | Li | |
| 2017/0147635 A1 | 5/2017 | McAteer et al. | |
| 2017/0154108 A1 | 6/2017 | Li et al. | |
| 2017/0177715 A1 | 6/2017 | Chang | |
| 2017/0195488 A1 | 7/2017 | Pendyaia | |
| 2017/0200220 A1 | 7/2017 | Nicholson | |
| 2017/0262429 A1 | 9/2017 | Harper | |
| 2017/0262530 A1 | 9/2017 | Okura | |
| 2017/0293610 A1 | 10/2017 | Tran | |
| 2018/0082183 A1 | 3/2018 | Hertz et al. | |
| 2018/0115644 A1 | 4/2018 | Al-Khaja | |
| 2018/0129372 A1 | 5/2018 | Ellis et al. | |
| 2018/0144250 A1 | 5/2018 | Kwon | |
| 2018/0150459 A1 | 5/2018 | Farid | |
| 2018/0288098 A1 | 10/2018 | Wang | |
| 2018/0300310 A1 | 10/2018 | Shinn | |
| 2018/0315000 A1 | 11/2018 | Kulkarni | |
| 2018/0315001 A1 | 11/2018 | Garner | |
| 2018/0338040 A1 | 11/2018 | Carly | |
| 2018/0365772 A1 | 12/2018 | Thompson | |
| 2018/0376002 A1 | 12/2018 | Abraham | |
| 2019/0042988 A1 | 2/2019 | Brown | |
| 2019/0080370 A1 | 3/2019 | Copeland | |
| 2019/0188617 A1* | 6/2019 | Copeland | G06Q 10/06311 |
| 2019/0206400 A1 | 7/2019 | Cui | |
| 2019/0212879 A1 | 7/2019 | Anand et al. | |
| 2019/0220794 A1 | 7/2019 | Kulkarni | |
| 2019/0340294 A1 | 11/2019 | Spangler | |
| 2019/0370669 A1 | 12/2019 | Pais et al. | |
| 2020/0042642 A1 | 2/2020 | Bakis | |
| 2020/0074322 A1* | 3/2020 | Chungapalli | G06F 18/29 |
| 2020/0097814 A1 | 3/2020 | Devesa | |

(56)  References Cited

U.S. PATENT DOCUMENTS

| | | | | |
|---|---|---|---|---|
| 2020/0110835 | A1 | 4/2020 | Zhao | |
| 2020/0111485 | A1* | 4/2020 | Copeland | H04M 3/51 |
| 2020/0160458 | A1 | 5/2020 | Bodin et al. | |
| 2020/0184556 | A1 | 6/2020 | Cella | |
| 2020/0372016 | A1 | 11/2020 | Rogynskyy et al. | |
| 2021/0004828 | A1* | 1/2021 | Adibi | H04M 3/5141 |
| 2021/0019674 | A1 | 1/2021 | Crabtree et al. | |
| 2021/0019701 | A1* | 1/2021 | Koch | G06Q 10/10 |
| 2021/0035041 | A1* | 2/2021 | Koch | G06Q 10/06316 |
| 2021/0350385 | A1* | 11/2021 | Ellison | G06N 20/00 |
| 2021/0406964 | A1 | 12/2021 | Copeland | |
| 2022/0328034 | A1 | 10/2022 | Tv | |
| 2023/0048077 | A1 | 2/2023 | Copeland | |
| 2023/0162121 | A1 | 5/2023 | Copeland | |
| 2023/0245651 | A1* | 8/2023 | Wang | G06N 5/022 |
| | | | | 704/275 |
| 2023/0274295 | A1 | 8/2023 | Copeland et al. | |

FOREIGN PATENT DOCUMENTS

| | | | |
|---|---|---|---|
| WO | WO 2016139666 | | 9/2016 |
| WO | WO 2018020517 | | 2/2018 |
| WO | 2020097275 | A1 | 5/2020 |

OTHER PUBLICATIONS

Earley, "Cognitive, computing, analytics and personalization" (Year: 2015).*

Tung, "Google's human sounding Al to answer calls at contact center" (Year: 2018).*

Office Action in Australian Appln. No. 2022215180, dated Aug. 3, 2023, 6 pages.

Liew, "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.lk/GDM/49/Slides/MarManaSampleAssi/MMAsuportingJouArti/13673270810884309.pdf> entire document.

Tung, "Google's human-sounding AI to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.

Wee, T., Perdana, A., & Remy, D. (2019). Data analytics dilemma at alpen hotel. Journal of Information Technology Teaching Cases, 9(2), 58-63. doi: http://dx.doi.org/10.1177/2043886919870543 (Year: 2019).

First Examination Report (FER) 202314011988, Mailed on Jul. 2, 2025, 7 pages.

* cited by examiner

REAL-TIME COLLATERAL RECOMMENDATION

PRIORITY CLAIM

This application claims priority to U.S. Provisional Application No. 63/313,820 filed on Feb. 25, 2022, the entire content of which is incorporated herein by reference.

BACKGROUND

Inside sales typically refers to sales made over the telephone, email, text, and other electronic communications channels. Such communications are often in disparate forms, often occur asynchronously, and are often not correlated with one another. Often a client of the business development representative ('BDR') operating sales for the client with customers may provide collateral material to present to the customer for purposes of business development and improved sales.

SUMMARY

In general, one innovative aspect of the subject matter described in this specification can be embodied in methods of real-time collateral recommendation for business development representatives ('BDR') that include the actions of receiving communications between a business development representative ('BDR') and a customer across disparate communications channels, each channel including a channel type, channel communications protocol, and channel form. The methods include normalizing the disparate communications in dependence upon normalization rules, summarizing the normalized communications in dependence upon summarization rules, creating semantic triples in dependence upon the summarized and normalized communications including applying a sales-directed taxonomy and ontology, identifying one or more insights in dependence upon the semantic triples, selecting, in real-time in dependence upon the identified insights, real-time collateral for the BDR related to the communications between the BDR and the customer, and presenting the selected real-time collateral to the BDR.

Other embodiments of this aspect include corresponding computer systems, apparatus, computer products, and computer programs recorded on one or more computer storage devices, each configured to perform the actions of the methods.

The foregoing and other embodiments can each optionally include one or more of the following features, alone or in combination. In particular, one embodiment includes all the following features in combination. In some implementations, the method further includes segmenting a candidate collateral and representing the segmented candidate collateral in a markup language.

In some implementations, the method further includes parsing the segmented candidate collateral into another set of semantic triples and storing the another set of semantic triples in an enterprise knowledge graph of a semantic graph database. The segmented candidate collateral can be parsed into the another set of semantic triples in dependence upon a collateral taxonomy. Identifying the one or more insights further can include extracting concepts from the segmented candidate collateral in dependence upon the another set of semantic triples stored in the enterprise knowledge graph of the semantic graph database.

In some implementations, receiving the communications between the BDR and the customer across the disparate communications channels includes receiving one of: live communications between the BDR and the customer, or recorded communications between the BDR and the customer.

In some implementations, selecting the real time collateral for the BDR includes selecting real-time collateral in dependence of post-call notes of the BDR or other BDRs.

In one or more implementations, the technology described herein can provide one or more of the following advantages. By providing a collection of artificial intelligence-based technologies, including natural and semantic language processing, the technology described herein allows for generating recommendations for relevant collateral material for a BDR to use during a live call with a customer. The generation of such relevant recommendations in real time can in turn can potentially improve quality, efficiency, and efficacy of sales calls, leading to increased productivity and revenue.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
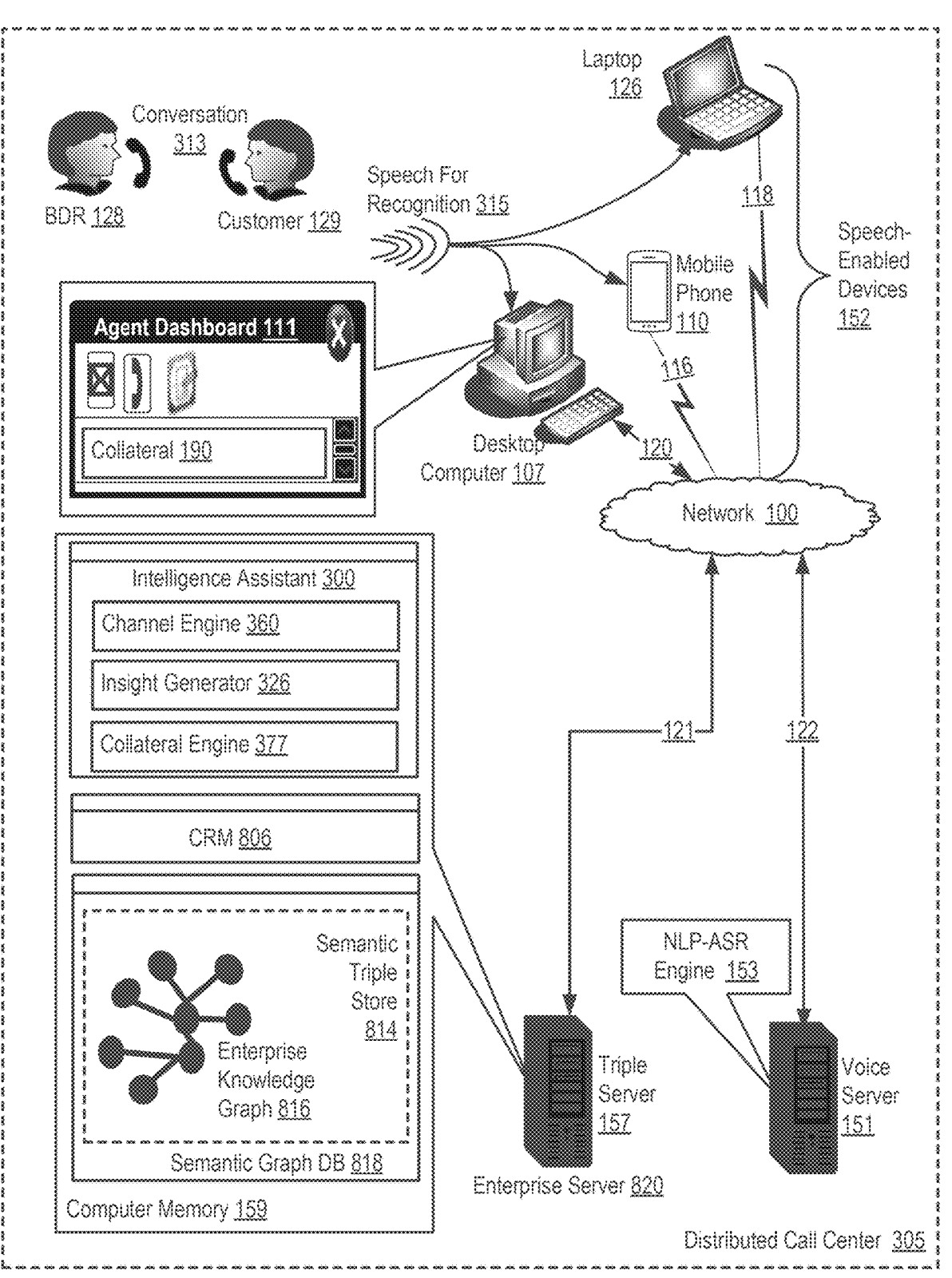
FIG. 1 sets forth a network diagram illustrating an example system for real-time collateral recommendation for business development representatives ('BDR') according to embodiments of the present technology.

Example methods, systems, apparatuses, and products for real-time collateral recommendation for business development representatives ('BDR') are described with reference to the accompanying drawings, beginning with FIG. 1. FIG. 1 sets forth a network diagram illustrating an example system for real-time collateral recommendation for business development representatives ('BDR'). Collateral, as used in this specification, can be taken to mean digital, print, audio, video, and other media used by BDRs (e.g., sales representatives, agents, or company representatives) to inform a sales process or (more generally) a conversation between the BDR and a customer. Real-time collateral according to the present technology is collateral presented to the BDR in real-time for use in a conversation or current sales cycle with a customer. The examples presented herein as collateral are not meant to be limiting in the types or forms of collateral that can be used by a BDR during a conversation with a customer, e.g., during a sales process.

The example system of FIG. 1 includes one or more speech-enabled devices (152), a triple server (157), and a voice server (151). A speech-enabled device is automated computing machinery configured to accept and recognize speech from a user and often express to a user voice prompts and speech responses. Speech-enabled devices in the example of FIG. 1 include a desktop computer (107), a mobile phone (110), a laptop computer (126), and an enterprise server (820) supporting an intelligence assistant (300) according to embodiments of the present technology. Each speech-enabled device in this example is coupled for data communications through a network (100) to the triple server (157) and the voice server (151). Although described here as a triple server (157) and voice server (151), the operations described with reference to each of the triple server (157) and voice server (151) can be performed by more or fewer servers in data communication with each other and with enterprise server 820 and one or more computer devices through network 100. In some implementations, enterprise server 820 can perform the operations described here with reference to the triple server (157) and/or voice server (151). The speech-enabled devices of FIG. 1 are also capable of communications over various other channels such as text, chat, email, telephony, chatbots, as well as communications through static means such as CRM data, catalogs, sales information, leads, and call notes.

The overall example system illustrated in FIG. 1 operates generally for real-time collateral recommendation for business development representatives ('BDR') by receiving communications between a business development representative ('BDR') (128) and a customer (129) across disparate communications channels, each channel comprising a channel type, channel communications protocol, and channel form. In the example of FIG. 1, the BDR (128) and the customer (129) may communicate through speech (315) over for example a VOIP communications channel, through text effected with a mobile phone (110), email sent through a laptop (126) and others discussed in more detail below.

The system of FIG. 1 operates also by normalizing the disparate communications in dependence upon normalization rules and summarizing the normalized communications in dependence upon summarization rules. Normalizing the disparate communications may be carried out by converting speech communications to text and maintaining text communications in text. Normalization may also include converting the text into a uniform font such as all capitalized letters in the same font, applying uniform spacing between words in the text, removing punctuation from the text, and so on.

The example system of FIG. 1 also operates generally by converting the speech for recognition to text. In other words, the term "speech for recognition" refers to recorded and/or real-time speech contributions from one or more participants that is converted to text, e.g., using speech-to-text methods, and used to generate the insight(s) as described in further detail below. In the example of FIG. 1, converting the speech communications to text is performed by invoking a natural language processing and automatic speech recognition (NLP-ASR) engine (153) operating on a voice server (151) is described in more detail below.

The system of FIG. 1 also operates by summarizing the normalized communications in dependence upon summarization rules. Summarizing the normalized communications in dependence upon summarization rules may be carried out by applying rules to reduce the text of the communications into more concise and meaningful statements. Such concise statements improve the effectiveness of parsing the summarized communications into semantic triples for insight generation. Summarizing the normalized communications may be carried out by reducing the overall content of the communications in a predetermined matter to focus the text of the communications for application of a taxonomy and ontology. In some embodiments, summarization rules may include, for example, removing predetermined adverbs, removing designated first words, adjusting or removing contractions, and replacing known phrases with a standardized language pattern, etc. The system of FIG. 1 also operates for real-time collateral recommendation for business development representatives ('BDR') by creating semantic triples in dependence upon the summarized and normalized communications including applying a sales-directed taxonomy and ontology. Generally, the system operates generally by parsing the converted text of the speech communications into semantic triples (138) and storing the semantic triples (138) in an enterprise knowledge graph (816) of a semantic graph database (818). In the example of FIG. 1, an intelligence assistant (300) residing on an enterprise server (820) parses the converted text into semantic triples (138) using a triple parser/serializer and stores the triples (138) in a semantic triple store (814) of enterprise knowledge graph (816) of a semantic graph database (818).

The system of FIG. 1 also operates generally by identifying one or more insights based on the semantic triples stored in the knowledge graph (816). Insights are made up of carefully evaluated information about current and potential customers, products, industries, sales cycles, BANT (Budget, Authority, Need, Timeline) characteristics, reaction sales calls, etc. Insights come from a combination of quantitative and qualitative administration and data analysis supported by intelligence assistants according to various embodiments described herein.

Insights according to some embodiments of the present technology are targeted for improved representation of the client by the BDR (128) and therefore targeted to improve the communications and sales experience between the BDR and the customer. Example insights include an industry, BANT, cost or pricing discussed on one or more sales calls, specific products discussed, key gatekeepers to the sales process, next best action in the customer relationship, a job title of the customer, and cost of product questions.

The system of FIG. 1 also operates generally by selecting, in real-time in dependence upon the identified insights, real time collateral for the BDR related to the communications between the BDR and the customer. Collateral according to embodiments described herein is often sales collateral. Sales collateral can be, for example, digital, print, video, and other media used by salespersons to persuade customers of the value of a particular product or solution. The objective of sales collateral is to provide the target audience with the requisite information to help them evaluate, decide and purchase. Real-time collateral according to the present technology is collateral presented to the BDR in real-time for use in a conversation or current sales cycle with a customer.

Selecting real-time collateral according to some embodiments of the example of FIG. 1 may be carried out by selecting specific collateral targeted to the current interaction between the BDR and the customer. Often such selection may occur based in part on insights that include, for example, (i) a stage in a sales cycle, (ii) specific keywords made in the speech or text conversation, (iii) identification of price of a product made in the speech or text conversation, (iv) job title of customer, specific questions or (v) other factors related to the sales process.

In some implementations, collateral engine (377) generates a repository of pre-processed collateral that is accessible by the intelligence assistant (300) during a sales process to provide relevant collateral to the BDR, as described in further detail below. Collateral engine (377) can pre-process collateral using collateral-specific taxonomy and ontology to generate sematic triples specific to the collateral. The collateral-based semantic triples can be stored in an enterprise knowledge graph in a graph database. The collateral-based semantic triples can be searchable, e.g., using a query, where the returned semantic triples in response to a query can be used to select the collateral from which the semantic triples were generated.

In some implementations, the intelligence assistance (300) can use generated insights to select collateral for the BDR related to the communications between the BDR and the customer, as discussed in further detail below and with reference to FIG. 7.

The system of FIG. 1 also operates generally by presenting the selected real-time collateral (190) to the BDR (128). In the example of FIG. 1, the selected real-time collateral is presented to the BDR through an agent dashboard (111). The agent dashboard (111) of FIG. 1 is a user interface provided by an agent dashboard application that presents to the BDR insights, collateral, the BDR's calendar, sales cycle information, and other information useful to the BDR.

In some embodiments, real-time collateral recommendation for business development representatives ('BDR') according to various embodiments of the present technology is speech-enabled. Often the speech for recognition is dictated by a BDR in preparation of a call between the BDR and a customer or the speech of that conversation between both the BDR and the customer itself. In some implementations, a word of digitized speech in this example is speech for recognition from a BDR (128) or a conversation between the BDR (128) and a customer (129). The speech for recognition can be an entire conversation, where, for example, all persons speaking are in the same room, and the entire conversation is picked up by a microphone on a speech-enabled device. The scope of speech for recognition can be reduced by providing, to a speech-enabled device, conversation from only to one person or a person on one side of a conversation, as only through a microphone on a headset. The scope of speech for recognition can be reduced even further by providing for recognition only speech that responds to a prompt from, for example, a VoiceXML dialogue executing on a speech-enabled device. As the scope of speech for recognition is reduced, data processing burdens are reduced across the system as a whole. In some implementations, conversations including multiple participants of the conversation can be used for speech for recognition.

Speech from a BDR and customer (129) in the example of FIG. 1 is converted into digitized speech by operation of a natural language processing speech recognition ("NLP-SR" or "NLP-ASR") engine (153), shown here disposed upon a voice server (151), but also may be installed locally on speech-enabled devices. The NLP-SR engine (153) converts the digitized speech into text, e.g., using speech-to-text conversion methods. The NLP-SR engine then performs a parsing of a word (509) of the text (508) into a semantic triple (752) of a description logic. The digitized speech (508) may be parsed into a triple of a description logic for use in real-time collateral recommendation for business development representatives ('BDR') according to embodiments of the present technology.

A triple is a three-part statement expressed in a form of logic. Depending on context, different terminologies are used to refer to effectively the same three parts of a statement in a logic. In first order logic, the parts are called constant, unary predicate, and binary predicate. In the Web Ontology Language ("OWL") the parts are individual, class, and property. In some description logics the parts are called individual, concept, and role.

In this example description, the elements of a triple are referred to as subject, predicate, and object—and expressed like this: <subject><predicate><object>. There are many modes of expression for triples. Elements of triples can be represented as Uniform Resource Locaters ("URLs"), Uniform Resource Identifiers ("URIs"), or International Resource Identifiers ("IRIs"). Triples can be expressed in N-Quads, Turtle syntax, TriG, Javascript Object Notation or "JSON," the list goes on and on. The expression used here, subject-predicate-object in angle brackets, is one form of abstract syntax, optimized for human readability rather than machine processing, although its substantive content is correct for expression of triples. Using this abstract syntax, here are examples of triples:

<Bob><is a><person>
    <Bob><is a friend of><Alice>
    <Bob><is born on><the $4^{th}$ of July 1990>
    <Bob><is interested in><the Mona Lisa>
    <the Mona Lisa><was created by><Leonardo da Vinci>
    <the video 'La Joconde à Washington'><is about><the Mona Lisa>

At times, a same item can be referenced in multiple triples. In the above example, Bob is the subject of four triples, and the Mona Lisa is the subject of one triple and the object of two. The ability to have the same item be the subject of one triple and the object of another makes it possible to effect connections among triples, where connected triples form graphs, as described in further detail below.

At times, a taxonomy can be generated, e.g., by the client, by the sales-agent, or another third-party, to bias the NLP-SR engine for frequently used (e.g., common) terminology. For example, the taxonomy can include sales related terminology for the client's product lines. Sales related terminology can include standard (e.g., static) vocabulary that can be used as differentiators between different products and product lines for the client. The sales related terminology can be used, by the NLP-SR engine (153) to segregate product-specific vocabulary from the speech contributions.

In some implementations, the taxonomy can include vocabulary files composed of phonetic names built from the existing taxonomy that can be used for phonetic assistance. Phonetic assistance can be used to assist the NLP-SR engine to handle non-standard speech contributions. For example, to recognize different aliases (e.g., different pronunciations) of the terminology. The vocabulary files can include an assembly of phonemes that are specific to the product, product lines, and/or company. For example, the phonemes can be generated for all the stock keeping units (SKUs) for a company. The taxonomy can be generated as a back-end process, e.g., a repository of terminology, vocabulary, phonetic assistance, phonemes, etc., can be stored in the voice server 151 to assist the NLP-SR engine 153 with generation of the semantic triples 138 from the converted speech-to-text.

In some implementations, the NLP-SR engine (153) can use entity extraction based on the stored vocabulary files to select and analyze the contextual clue words/phrases in the speech contributions including standard (e.g., known) taxonomy. For example, the NLP-SR engine can recognize standard taxonomy for a client, e.g., a product name or product line name, and search/select entities referenced in the phrase surrounding the standard taxonomy for contextual clues. For example, a phrase may include "You would like purchase an XYZ product in Q1", where "XYZ product" is recognized as the standard taxonomy and "you would like to purchase . . . in Q1" can be used to extract additional contextual clues, e.g., a purchase target date range, price points, quantities, configurations of specific products, or the like.

The example of FIG. 1 includes a semantic graph database (818) which includes an enterprise knowledge graph (816). A semantic graph is a configuration of memory that uses graph structures, nodes and edges, to represent and store data. A key concept of this kind of configuration is the graph (or edge or relationship), which directly relates data items in a data store. Data items stored in the knowledge graph can include many-to-many relationships, where a data item can include relationships to multiple other data items such that the relationships between the data item and the multiple different data items can be queried. The semantic graph database (818) can be specifically built around, for example, words, phrases, and dialect. The knowledge graph of the semantic graph database can be built around sentences and natural language processing such that queries of the knowledge graph can be queried and return semantic-based data, e.g., semantic triples. A graph database contrasts with more conventional storage such as a logical table, where links among data are mere indirect metadata, and queries search for data within the store using joins to collect related data. Semantic graphs, by design, can be utilized to establish explicit relationships amongst data, e.g., that can be otherwise difficult to model in relational systems or logical tables.

In the example of FIG. 1, the semantic graph database (818) includes an enterprise knowledge graph (816) including semantic triple store (814). The semantic triple store (814) of FIG. 1 includes triple stores for access by the intelligence assistant (300), the CRM (806) and other components.

The semantic triple store (814) includes semantic triples generated by the NLP-SR (153) from communications between the BDR and customer as well as semantic triples generated from the collateral, and are accessible by the intelligence assistant (300), a customer relationship management (CRM) system (806) and other components. The semantic triple store (814) of FIG. 1 contains structured definitions of words not special to any particular knowledge domain, where each structured definition of the general language store is implemented with a triple of description logic. The structured definitions define syntactical form, e.g., stored in vocabulary files, for the words/phrases extracted from the text generated by the NLP engine from the speech contributions. The semantic triple store (814) also includes structured definitions of words, e.g., taxonomies described above, that can be specific to processing particular knowledge domains such as products, jargon of an industry, particular industries, geographic areas, where the vocabulary of the product triple store is implemented with a triple of description logic.

The semantic triple store (814) in the example of FIG. 1 includes triples stored in the enterprise knowledge graph (816). The triples is a generated from the speech communication between the BDR and customer and defining of various forms of information useful in insight generation according to embodiments of the present technology. Triples may be queried by an intelligence assistant engine to retrieve insights, to prepare call notes parsed into semantic triples, identify customer connections, identify relevant use cases, identify chats, identify installed technology of a customer, produce talk tracks, and identify product recommendations. The intelligence assistant can, in response to a user-provided query, generate a structured query to search the knowledge graph and generate a representation of the returned data in response to the query. The representation of the data responsive to the query can be, for example, a graphical, audio, video, spreadsheet, etc. representation of the data. For example, the representation of the data can include one or more plots including analysis of the data responsive to the query. In another example, the representation of the data can include one or more audio clips from recorded speech communications for sale calls. At times, raw data responsive to the query can be provided, such that a user may perform a separate analysis step on the raw data.

The information stored in enterprise knowledge graph (816) of FIG. 1 is presented for explanation and not for limitation. The enterprise knowledge graph may be used to store other information useful in insight generation according to various embodiments described herein.

The example of FIG. 1 also includes an intelligence assistant (300). The intelligence assistant of FIG. 1 is a speech-enabled platform capable of insight generation and management of the semantic graph database as discussed in more detail below with reference to FIG. 4. The intelligence assistant (300) includes a customer relationship management (CRM) (806). The CRM is a CRM system configured for the use of BDRs and other users of the enterprise. Often data stored on and accessed by the CRM is data owned by the enterprise itself and collected over time for the use of various users of the organization. In other embodiments, the CRM may be owned by a client of the call center and the data residing in that CRM is owned by the client.

In some implementations, intelligence assistant (300) and CRM (806) can be hosted by an enterprise server (820), e.g., also hosting a triple server (157). The intelligence assistance (300) can be in data communication with additional servers, for example, a voice server (151), a lead engine (134), a social media server (130), and an industry server (130). The intelligence assistant (300) and the CRM (806) can be connected for data communications to an enterprise server (820), a triple server (157), and a voice server (151).

The intelligence assistant (300) of FIG. 1 includes a channel engine (360). The channel engine (360) of FIG. 1 provides a communications listener (330) that listens over disparate communications channels and provides the communication for use by the intelligence assistant 300 in developing insights according to embodiments of the present technology. As discussed below with reference to FIG. 2, examples of disparate communications channels include, for example, chat, email, VOIP, leads, recorded calls, chatbots, text messages, and call notes others.

The intelligence assistant (300) of FIG. 1 also includes an insight generator (326). In the example of FIG. 1, many components useful in insight generation according to embodiments of the present invention are maintained in computer memory (159). In the example of FIG. 1, computer memory (159) includes cache, random access memory ("RAM"), disk storage, and so on, most forms of computer memory. Computer memory (159) so configured typically resides on speech-enabled devices, or as shown here, upon one or more triple servers (157), voice servers, or enterprise servers (820)

The system of FIG. 1 includes a collateral engine (377), automated computing machinery capable of selecting, in real-time in dependence upon the identified insights, real time collateral for the BDR related to the communications between the BDR and the customer; and presenting the selected real-time collateral to the BDR, e.g., as described in further detail with reference to FIG. 7. In the example of FIG. 1, the real-time collateral is presented through an agent dashboard.

Figure 2:
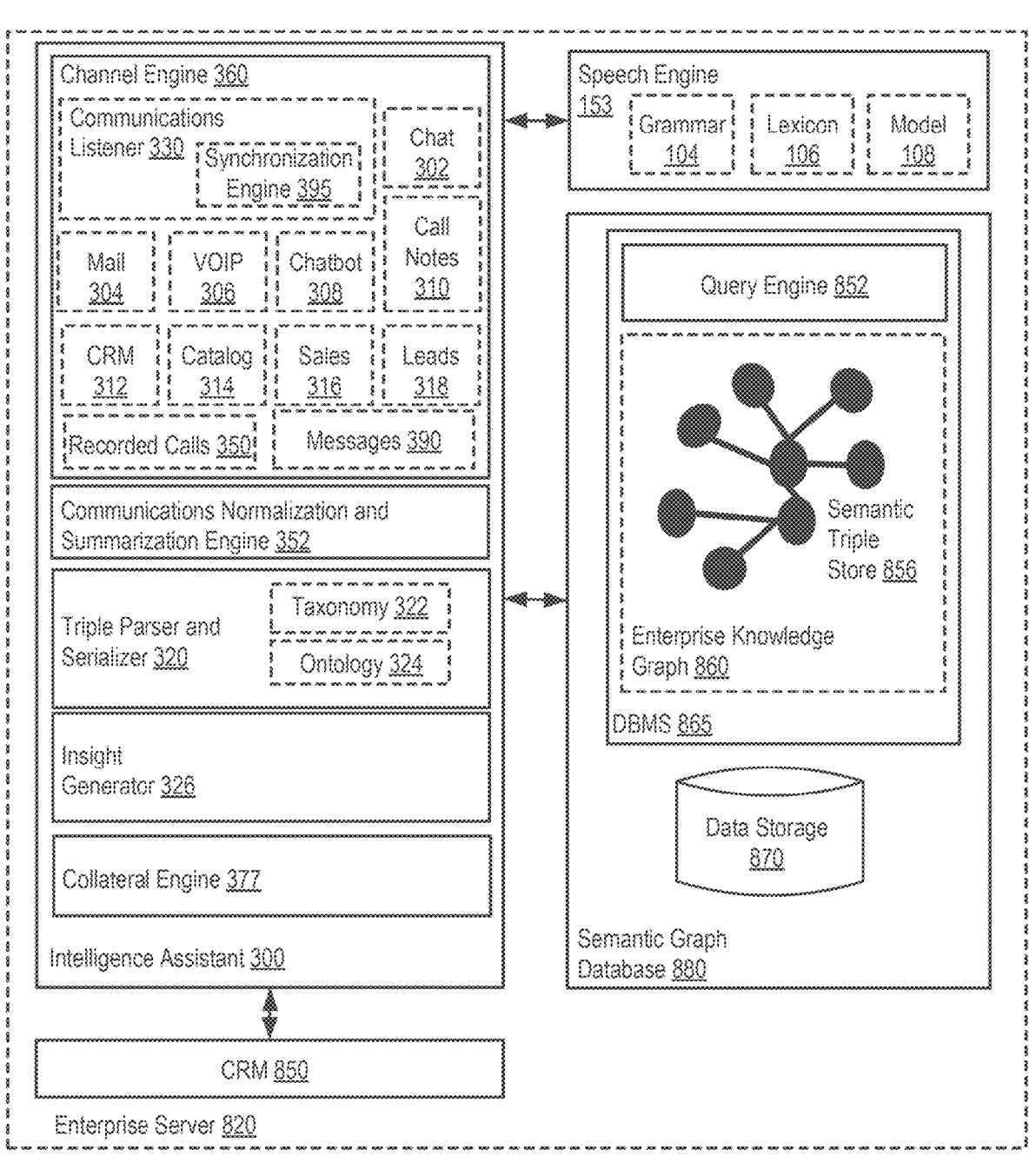
FIG. 2 sets forth a diagram illustrating an example system for real-time collateral recommendation for business development representatives ('BDR') according to embodiments of the present technology.

For further explanation, FIG. 2 sets forth a diagram illustrating an example system for real-time collateral recommendation for business development representatives ('BDR'). The system of FIG. 2 includes an enterprise server (820). The example enterprise server of FIG. 2 is implemented as one or more computers that stores programs serving the collective needs of an enterprise rather than a single user or a single department. An enterprise server can refer to both the computer hardware and its main software, operating system, firmware, additional software, and so on. The enterprise server (820) in the example system of FIG. 2 can host an intelligence assistant (300) that includes a channel engine (360), a communications normalization and summarization engine (352), a triple parser and serializer (320), and an insight generator (326). The enterprise server (820) in the example of FIG. 2 can host a speech engine (153) and a semantic graph database (880). The enterprise server of FIG. 1 is depicted as unified automated computing machinery but in many embodiments of the present technology such an enterprise server and its components may, and often will, be distributed.

The intelligence assistant (300) of FIG. 2 is a targeted collection of artificial intelligence-based technologies. In some implementations, the intelligence assistant (300) can include natural and semantic language processing that processes unstructured communications into structured information, e.g., using pre-defined taxonomy, and generates in dependence upon the structured information insights available for sales assistance, ultimately driving improved quality and efficiency of the BDR. The intelligence assistant (300) of FIG. 2 includes a channel engine (360). In the example of FIG. 2, the channel engine (360) is configured to administer communications across disparate communications channels. The channel engine (360) of FIG. 2 provides an always-on communications listener (330) that listens over each of the communications channels and administers the consumption of the disparate communications for use by the intelligence engine.

In some embodiments of the present technology, a communications channel is associated with a communications type, communications protocol, and communications form. For example, a communications channel characterized as type email is administered using a protocol such as Simple Mail Transfer Protocol ('SMTP') and may be associated with a form of text communications.

In the example of FIG. 2, the channel engine (360) is configured to administer communications through chat (302) and chatbots (308) through the use of, for example, instant messaging protocols such as SMS, Bonjour, MSNP, and others. The example channel engine (360) administers communications with email (304) using various email protocols such as IMAP, POP3, SMTP, Exchange, and others. The example channel engine (360) may administer commu nications using voice over Internet Protocol ('VOIP') communications with live, recorded (350), or automated participants. The channel engine of FIG. 2 is configured to administer communications through messages (390) using protocols such as SMS messaging protocols, MMS protocols, etc. The communications channel may also administer communications with engines, services, and other resources to retrieve static call notes (310), communicated with a CRM (312) static catalogs (314), sales engines (316), lead engines (318), and other resources such as through the use of API's or other invocation methods.

The communications listener (330) of FIG. 2 also includes a synchronization engine (395), a module of automated computing machinery that synchronizes the disparate communications for real-time collateral recommendation for business development representatives ('BDR'). In some embodiments, communications through disparate channels are synchronized in dependence upon one or more attributes of the communications between the tele-agent and the customer. Such attributes may be identified from metadata associated with the communications, the content of the communications itself or in other ways. In some implementations, the communications through disparate channels are synchronized in dependence upon one or more rules, e.g., rules defining of the one or more attributes, for the communications between the tele-agent and the customer. Communications may be synchronized in dependence upon, for example:

the tele-agent ID the customer ID the sales campaign, the time of communication between a tele-agent and a particular customer the content of communication including for example, product identification.

Such synchronized communications often provide an improved body of communications for insight generation.

Communications administered by the communications engine may be text-based and often that text is maintained to be ingested by the intelligence assistant. Other example communications include live or recorded speech which is converted to text by the speech engine (153) for consumption by the intelligence assistant. Regardless of the original form, whether text or speech, the communications are either maintained in text or converted to text and then normalized.

The example of FIG. 2 includes a communications normalization and summarization engine (352). The normalization and summarization engine (352) places the communications in a uniform format such as removing punctuation, placing the text in a predetermined font such as all capital letters of a particular font, and removing extras spaces and providing uniform spacing of the words of the text of the communication. In addition to normalization, the communications are summarized according to summarization rules. Summarization rules focus on the content of the communications for application of a taxonomy and ontology such that the communications may be parsed into semantic triples for use in identifying sales insights.

The intelligence assistant (300) of FIG. 2 includes a triple parser and serializer (306). The triple parser of FIG. 2 takes as input a file in some format such as the standard RDF/ XML, format, which is compatible with the more widespread XML, standard. The triple parser takes such a file as input and converts it into an internal representation of the triples that are expressed in that file. At this point, the triples are stored in the triple store are available for all the opera tions of that store. Triples parsed and stored in the triple store can be serialized back out using the triple serializer (306).

The semantic graph database (818) of FIG. 2 is a type of graph database that is capable of integrating heterogeneous data from many sources and making links between datasets. It focuses on the relationships between entities and is able to infer new knowledge out of existing information. For example, as described above, graph database (818) can store semantic triples generated from the normalized and summarized communications between the BDR and customers and sematic triples generated from collateral. The semantic technology of FIG. 2 can link new information automatically, e.g., using link prediction or another related technique, without manual user intervention or the database being explicitly pre-structured. This automatic linking is powerful when fusing data from inside and outside company databases, such as corporate email, documents, spreadsheets, customer support logs, relational databases, government/public/industry repositories, news feeds, customer data, social networks and much more. In traditional relational databases this linking involves complex coding, data warehouses and heavy pre-processing with exact a priori knowledge of the types of queries to be asked.

The semantic graph database (818) of FIG. 2 includes a database management system 'DBMS' (865) and data storage (870). The DBMS (865) of FIG. 2 includes an enterprise knowledge graph (816) and a query engine (852). The enterprise knowledge graph of FIG. 2 is a structured representation of data stored in data storage (870), e.g., semantic triple store (856). The query engine (852) of FIG. 2 receives structured queries and retrieves stored information in response. Structured queries can be generated, for example, by a structured query interface (e.g., SPARQL) from a user-provided query. The structured queries can be generated by the structured query interface to be compatible with searching the knowledge graph.

The system of FIG. 2 includes a speech engine (153). The example speech engine includes an NLP engine and ASR engine (e.g., also referred to herein as "NLP-SR" engine) for speech recognition and text-to-speech ('TTS') for generating textual transcription of speech communications. At times, the NLP-SR engine (153) is configured to access a repository of taxonomy, e.g., vocabulary files, that can be used to process the speech contributions. The example speech engine (153) includes a grammar module (104), a lexicon module (106), and a language-specific acoustic model (108) as discussed in more detail below.

The intelligence assistant (300) of FIG. 2 includes a channel engine (360), a module of automated computing machinery that administers communications over disparate communications channels such that information may be ingested into the intelligent assistant without limitation to its original form or communications channel. The channel engine (360) establishes communications sessions using disparate protocols such as SMS, HTTP, VOIP and other telephony, POTS, email, text streams, static text, etc.

In the example of FIG. 2, the channel engine (360) is configured to administer communications through chat (302) and chatbots (308) using, for example, instant messaging protocols such as SMS, Bonjour, MSNP, etc. The example channel engine (360) administers communications with email (304) using various email protocols such as IMAP, POP3, SMTP, Exchange, and others. The example channel engine (360) may administer communications using voice over Internet Protocol ('VOIP') communications with live, recorded, or automated participants. The communications channel may also administer communications with engines, services, and other resources to retrieve static call notes (310), communicated with a CRM (312) static catalogs (314), sales engines (316), lead engines (318), and other resources such as using API's or other invocation methods.

Communications administered by the communications engine may be text-based and often that text is maintained to be ingested by the intelligence assistant. Other communications may be live or recorded speech which is converted to text by the speech engine (153) for consumption by the intelligence assistant.

The channel engine (360) provides an always-on communications listener (330) that listens over each of the communications channels and provides the communication for use by the intelligence engine. Once the communications are received by the intelligence assistant, the text is then parsed into semantic triples, e.g., using the NLP-SR engine (153), such that the information may be usefully used to identify sales insights. The enterprise server (820) of FIG. 2 includes a triple parser and serializer (306). The triple parser and serializer (306) can be, as depicted in FIG. 2, a part of the intelligence assistant (300). At times, voice server (e.g., voice server (151) depicted in FIG. 1, can perform the actions described with reference to the triple parser and serializer (306). The triple parser of FIG. 2 takes as input a file in some format, for example, such as the standard RDF/XML format, which is compatible with the more widespread XML standard. The triple parser receives a file as input and converts it into an internal representation of the triples that are expressed in that file as output. At this point, the triples are stored in the triple store (856) can be available for all the operations of the store. Triples parsed and stored in the triple store can be serialized back out using the triple serializer (306).

The triple parser of FIG. 2 creates triples in dependence upon at least one of a taxonomy (322) and an ontology (324). The taxonomy (322), e.g., as described above with reference to FIG. 1, includes words or sets of words with defined semantics that will be stored as triples. To parse speech into semantic triples the triple parser receives text converted from speech by the speech engine and identifies portions of that text that correspond with the taxonomy and forms triples using the defined elements of the taxonomy.

The triple parser of FIG. 2 also creates triples in dependence upon an ontology (324). An ontology is a formal specification that provides sharable and reusable knowledge representation. An ontology specification includes descriptions of concepts and properties in a domain, relationships between concepts, constraints on how the relationships can be used and other concepts and properties.

The enterprise server (820) of FIG. 2 includes a CRM (806), automated computing machinery that provides contact management, sales management, agent productivity administration, and other services targeted to improved customer relations and ultimately customer satisfaction and enterprise profitability. The example CRM of FIG. 2 manages manage customer relationships across the entire customer lifecycle, individual sales cycles, campaigns, driving marketing, sales, and customer service and so on. Such information is usefully ingested, parsed, and stored by the intelligence assistant for use in generating insights according to various embodiments of the present technology.

In some implementations, the intelligence assistant (300) of FIG. 2 includes an insight generator (326) that includes a vector engine (380). The insight generator of FIG. 2 operates for real-time collateral recommendation for business development representatives ('BDR') by creating a multidimensional vector encoded with the semantic triples. The vector engine (380) generates n-dimensional vectors encoded with the semantic triples extracted by the NLP-SR for the speech communication. The vector engine (38) additionally generates n-dimensional vectors encoded with the semantic triples extracted from the collateral.

In some implementations, an n-dimensional vector is configured to store, within the n-dimensions, structured data. Vectors can store structured data extracted from the collateral or from the speech communications between the BDR and customer. The structured data can correspond to one or more features, e.g., extracted from a communication between a BDR and customer or from the collateral, and analyzed based on a pre-generated, respective taxonomy. For example, using the taxonomy for the collateral that can be different from the taxonomy for the communication. Structured data can include, for example, structured strings, numerical values, etc. The structured data can conform to a taxonomy, e.g., taxonomies used to by the intelligent assistant 135 to process the communication data and store the communication data in the graph database 155. The generated vectors can be stored in the enterprise knowledge graph of the semantic graph database (880).

In some implementations, the intelligence assistant (300) can select a collateral to provide to the BDR in response to a real-time conversation with a customer, e.g., during or after the conversation. Selecting the collateral can include generating, from the communication between the BDR and customer, vector(s) encoded with semantic triples and, using the communication-generated vectors, querying the semantic graph database (880) for collateral-generated vectors.

In some implementations, selecting collateral can include performing vector comparison between a vector generated from the communication between the BDR and customer and vectors generated from the collateral. For example, a vector comparison process including vector matching based on a confidence score can be used to select and rank vectors generated from the collateral. A highest ranked (or a set of highest ranked) vectors can be used to identify respective collateral, where each vector includes a reference to the collateral from which it is generated. The selected collateral can then be provided to the BDR.

In some implementations, the insight generator (326) of FIG. 2 queries the query engine (853) of the semantic graph database (880) and identifies insights in dependence upon the results of the queries. Insight generators according to embodiments of the present technology often generate queries using a query language. Query languages may be implemented as an RDF query language such as SPARQL.

In some embodiments of the present technology, insights may be selected from predefined insights meeting certain criteria of the search results or may be formed from the query results themselves. Such insights may be useful to a sales agent during a conversation with a customer. Examples of insights useful according to embodiments of the present technology include information about an industry, a customer job title, insights relating to budget, authority, need, and time ('BANT'), cost and pricing information, competitive products, positive or negative sentiment in call, chat, email or other communication, identification of key individuals, targets reached, contacts reached, industry terms, next best action for a tele-agent, product recommendations, custom metrics, etc.

The intelligence assistant (300) of FIG. 2 includes a collateral engine (377). The collateral engine (377) of FIG. 2 is implemented automated computing machinery configured for selecting, in real-time in dependence upon the identified insights, real time collateral for the BDR related to the communications between the BDR and the customer and presenting the selected real-time collateral to the BDR. For example, the real-time collateral for the BDR can be selected by querying the enterprise knowledge graph including stored semantic triples generated from the collateral.

Figure 3:
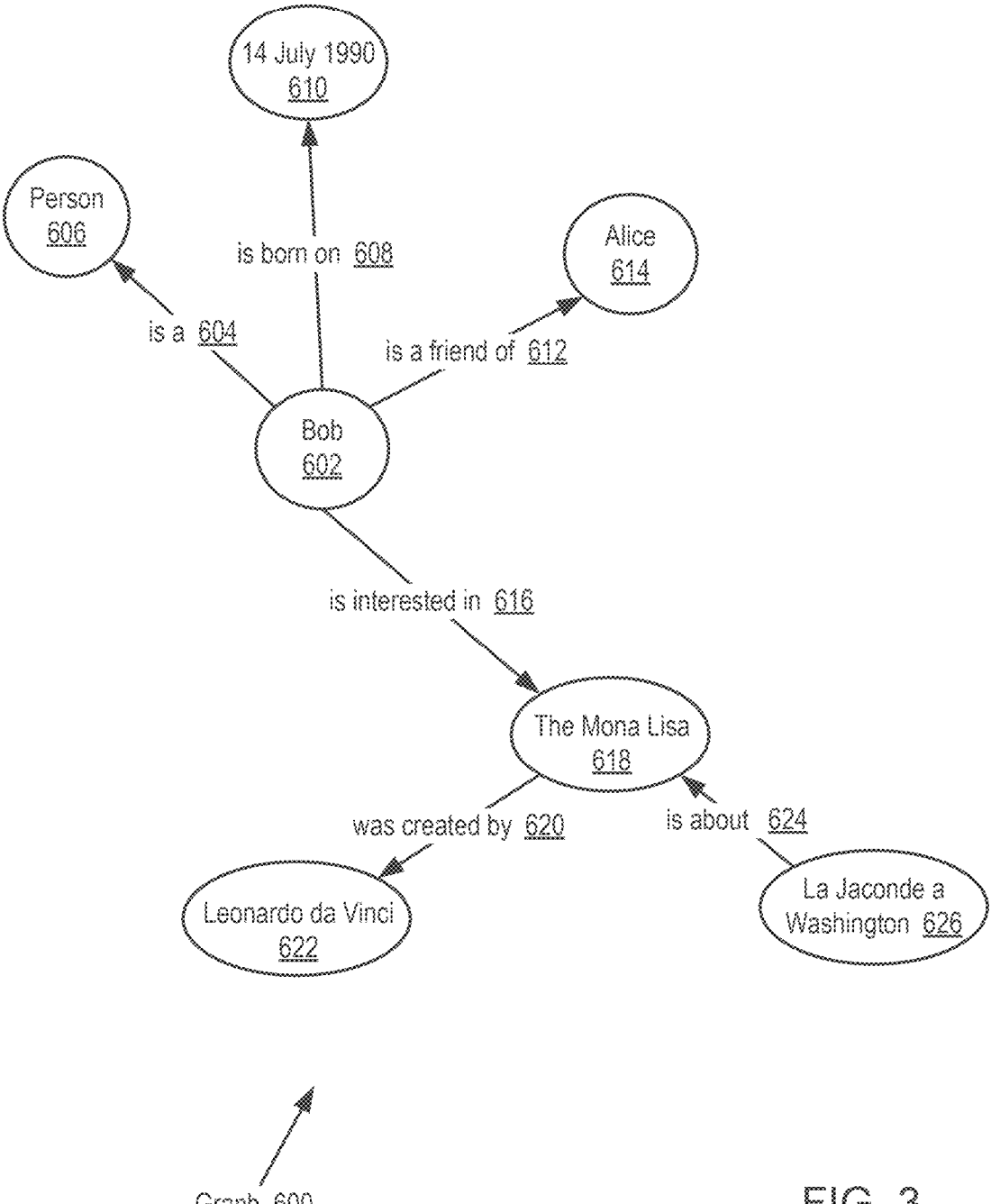
FIG. 3 sets forth a line drawing of a graph.

For further explanation of relations among triples and graphs, FIG. 3 sets forth a line drawing of a graph (600). The example graph of FIG. 3 implements in graph form the example triples set forth above regarding Bob and the Mona Lisa. In the example of FIG. 3, the graph edges (604, 608, 612, 616, 620, 624) represent respectively relations among the node, that is, represent the predicates <is a>, <is a friend of>, <is born on>, <is interested in>, <was created by>, and <is about>. The nodes themselves represent the subjects and objects of the triples, <Bob>, <person>, <Alice>, <the $4^{th}$ of July 1990>, <the Mona Lisa>, <Leonardo da Vinci>, and <the video 'La Joconde a Washington'>.

In systems of knowledge representation, knowledge represented in graphs of triples, including, for example, knowledge representations implemented in Prolog databases, Lisp data structures, or in RDF-oriented ontologies in RDFS, OWL, and other ontology languages. Search and inference are effected against such graphs by search engines configured to execute semantic queries in, for example, Prolog or SPARQL. Prolog is a general-purpose logic programming language. SPARQL is a recursive acronym for "SPARQL Protocol and RDF Query Language." Prolog supports queries against connected triples expressed as statements and rules in a Prolog database. SPARQL supports queries against ontologies expressed in RDFS or OWL or other RDF-oriented ontologies. Regarding Prolog, SPARQL, RDF, and so on, these are examples of technologies explanatory of example embodiments of the present technology. Other knowledge representations are also within the scope of the technology described herein.

A description logic is a member of a family of formal knowledge representation languages. Some description logics are more expressive than propositional logic but less expressive than first-order logic. In contrast to first-order logics, reasoning problems for description logics are usually decidable. Efficient decision procedures therefore can be implemented for problem of search and inference in description logics. There are general, spatial, temporal, spatiotemporal, and fuzzy descriptions logics, and each description logic features a different balance between expressivity and reasoning complexity by supporting different sets of mathematical constructors.

Search queries can be provided having a range of semantic structure. In other words, a search query need not conform to a pre-defined sematic structure (e.g., structured data) in order to return collateral. A traditional web search, for example, can be (e.g., substantially) unstructured in that is includes no semantic structure. A traditional web search against the keyword "derivative" returns HTML documents discussing the literary concept of derivative works as well as calculus procedures. A traditional web search against the keyword "differential" returns HTML pages describing automobile parts and calculus functions.

Other queries can include a range of structured input, e.g., depending in part on the fraction of structured data included in the search query. For example, a portion of the query can be provided as structured data, e.g., conforming to a syntax of the database. Such systems may be termed executable rather than decidable. In some embodiments, decidability may not be a primary concern. In many Web applications, for example, data sets are huge, and may not require a 100 percent correct model to analyze data that may have been spidered, scraped, and converted into structure by some heuristic program that itself is imperfect.

Other classes of queries can be disposed where correctness of results is key, and decidability enters. A user who is a BDR in a data center speaking by phone with an automotive customer discussing a front differential is concerned not to be required to sort through calculus results to find correct terminology. Such a user needs correct definitions of automotive terms, and the user needs query results in conversational real time, that is, for example, within seconds.

In formal logic, a system is decidable if there exists a method such that, for every assertion that can be expressed in terms of the system, the method is capable of deciding whether or not the assertion is valid within the system. In practical terms, a query against a decidable description logic will not loop indefinitely, crash, fail to return an answer, or return a wrong answer. A decidable description logic supports data models or ontologies that are clear, unambiguous, and machine-processable. Undecidable systems do not. A decidable description logic supports algorithms by which a computer system can determine equivalence of classes defined in the logic. Undecidable systems do not. Decidable description logics can be implemented in C, C++, SQL, Lisp, RDF/RDFS/OWL, and so on. In the RDF space, subdivisions of OWL vary in decidability. Full OWL does not support decidability. OWL DL does.

Figure 4:
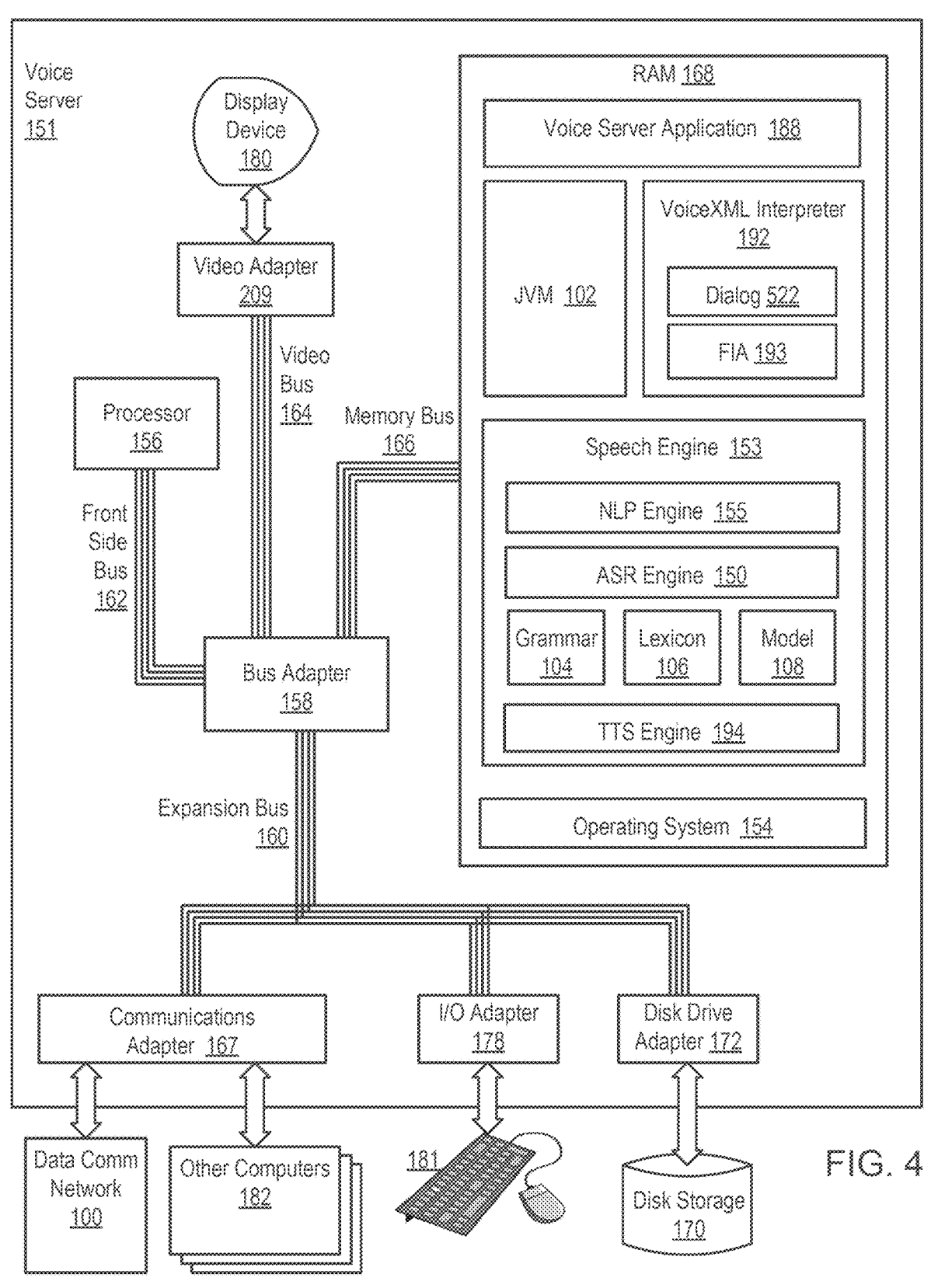
FIG. 4 sets forth a block diagram of automated computing machinery comprising an example of a computer useful as a voice server according to embodiments of the present technology.

Real-time collateral recommendation for business development representatives ('BDR') according to embodiments of the present technology, particularly in a thin-client architecture, may be implemented with one or more voice servers. A voice server is a computer, that is, automated computing machinery, that provides speech recognition and speech synthesis. FIG. 4 sets forth a block diagram of automated computing machinery comprising an example of a computer useful as a voice server (151) for a speech-enabled device useful according to embodiments of the present technology. The voice server (151) of FIG. 4 includes at least one computer processor (156) or 'CPU' as well as random access memory (168) ('RAM') which is connected through a high-speed memory bus (166) and bus adapter (158) to processor (156) and to other components of the voice server.

Stored in RAM (168) is a voice server application (188), a module of computer program instructions capable of operating a voice server in a system that is configured for use in configuring memory according to some embodiments of the present technology. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in speech-enabled applications such as, for example, speech-enabled browsers, X+V applications, SALT applications, or Java Speech applications, and so on.

Voice server application (188) may be implemented as a web server, implemented in Java, C++, Python, Perl, or any language that supports X+V, SALT, VoiceXML, or other speech-enabled languages, by providing responses to HTTP requests from X+V clients, SALT clients, Java Speech clients, or other speech-enabled client devices. Voice server application (188) may, for a further example, be implemented as a Java server that runs on a Java Virtual Machine (102) and supports a Java voice framework by providing responses to HTTP requests from Java client applications running on speech-enabled devices. Although depicted with reference to FIG. 4 as implemented as a Java Virtual Machine (102), other virtual machine platforms configured to enable the voice server application (188) and processes thereof can be used. And voice server applications that support embodiments of the present technology may be implemented in other ways.

The voice server (151) in this example includes a natural language processing speech recognition ("NLP-SR") engine (153). An NLP-SR engine is sometimes referred to in this paper simply as a 'speech engine.' A speech engine is a functional module, typically a software module, although it may include specialized hardware also, that does the work of recognizing and generating human speech. In this example, the speech engine (153) is a natural language processing speech engine that includes a natural language processing ("NLP") engine (153). The NLP engine accepts recognized speech from an automated speech recognition ('ASR') engine, processes the recognized speech into parts of speech, subject, predicates, object, and so on, and then converts the recognized, processed parts of speech into semantic triples for inclusion in triple stores.

The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates speech feature vectors ('SFVs') with phonemes representing pronunciations of words in a human language often stored in a vocabulary file. The lexicon (106) is an association of words in text form with phonemes representing pronunciations of each word; the lexicon effectively identifies words that are capable of recognition by an ASR engine. Also stored in RAM (168) is a Text-To-Speech ('TTS') Engine (194), a module of computer program instructions that accepts text as input and returns the same text in the form of digitally encoded speech, for use in providing speech as prompts for and responses to users of speech-enabled systems.

The grammar module (104) communicates to the ASR engine (150) the words and sequences of words that currently may be recognized. For further explanation, distinguish the purpose of the grammar and the purpose of the lexicon. The lexicon module (106) associates with phonemes all the words that the ASR engine can recognize. The grammar module communicates the words currently eligible for recognition. The two sets of words identified by the grammar module and lexicon module at any time may be a same set of words or different sets of words.

Grammars may be expressed in a number of formats supported by ASR engines, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone <name>
    <when>;
    <name> = bob | martha | joe | pete | chris | john | harold;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'harold', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The voice server application (188) in this example is configured to receive, from a speech-enabled client device located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a speech feature vector or SFV. An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on speech-enabled devices, from X+V clients running remotely on speech-enabled devices, from SALT clients running on speech-enabled devices, from Java client applications running remotely on multimedia devices, and so on. In this example, VoiceXML interpreter (192) interprets and executes VoiceXML segments representing voice dialog instructions received from remote speech-enabled devices and provided to VoiceXML interpreter (192) through voice server application (188).

A speech-enabled application may provide voice dialog instructions, VoiceXML segments, VoiceXML <form> elements, and the like, to VoiceXML interpreter (149) through data communications across a network with such a speech-enabled application. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm (FIX) (193). The VoiceXML interpreter interprets VoiceXML dialogs provided to the VoiceXML interpreter by a speech-enabled application.

As mentioned above, a Form Interpretation Algorithm ('FIA') drives the interaction between the user and a speech-enabled application. The FIA is generally responsible for selecting and playing one or more speech prompts, collecting a user input, either a response that fills in one or more input items, or a throwing of some event, and interpreting actions that pertained to the newly filled-in input items. The FIA also handles speech-enabled application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

Also stored in RAM (168) is an operating system (154). Operating systems useful in voice servers according to embodiments of the present technology include, for example, UNIX™, Linux™, Microsoft NT™, AIX™, and IBM's i5/OS™. Operating system (154), voice server application (188), VoiceXML interpreter (192), ASR engine (150), JVM (102), and TTS Engine (194) in the example of FIG. 3 are shown in RAM (168), but many components of such software typically are stored in non-volatile memory also, for example, on a disk drive (170).

Voice server (151) of FIG. 4 includes bus adapter (158), a computer hardware component that contains drive electronics for high-speed buses, the front side bus (162), the video bus (164), and the memory bus (166), as well as drive electronics for the slower expansion bus (160). Examples of expansion buses useful in voice servers according to embodiments of the present technology include Industry Standard Architecture (ISA') buses and Peripheral Component Interconnect (PCP) buses.

Voice server (151) of FIG. 4 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include, for example, Integrated Drive Electronics ('IDE') adapters, and Small Computer System Interface (SCSI') adapters. In addition, non-volatile computer memory may be implemented for a voice server as an optical disk drive, electrically erasable programmable read-only memory (so-called 'EEPROM' or 'Flash' memory), RAM drives, and so on.

The example voice server of FIG. 4 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 3 includes a video adapter (209), which is an example of an I/O adapter specially designed for graphic output to a display device (180) such as a display screen or computer monitor. Video adapter (209) is connected to processor (156) through a high-speed video bus (164), bus adapter (158), and the front side bus (162), which is also a high-speed bus.

The example voice server (151) of FIG. 4 includes a communications adapter (167) for data communications with other computers (182) and for data communications with a data communications network (100). Such data communications may be carried out, for example, serially through RS-232 connections, through external buses such as a Universal Serial Bus ('USB'), and through data communications data communications networks such as IP data communications networks. Communications adapters implement the hardware level of data communications through which one computer sends data communications to another computer, directly or through a data communications network. Examples of communications adapters useful for embodiments of the present technology include, for example, modems for wired dial-up communications, Ethernet (IEEE 802.3) adapters for wired data communications network communications, and 802.11 adapters for wireless data communications network communications.

Figure 5:
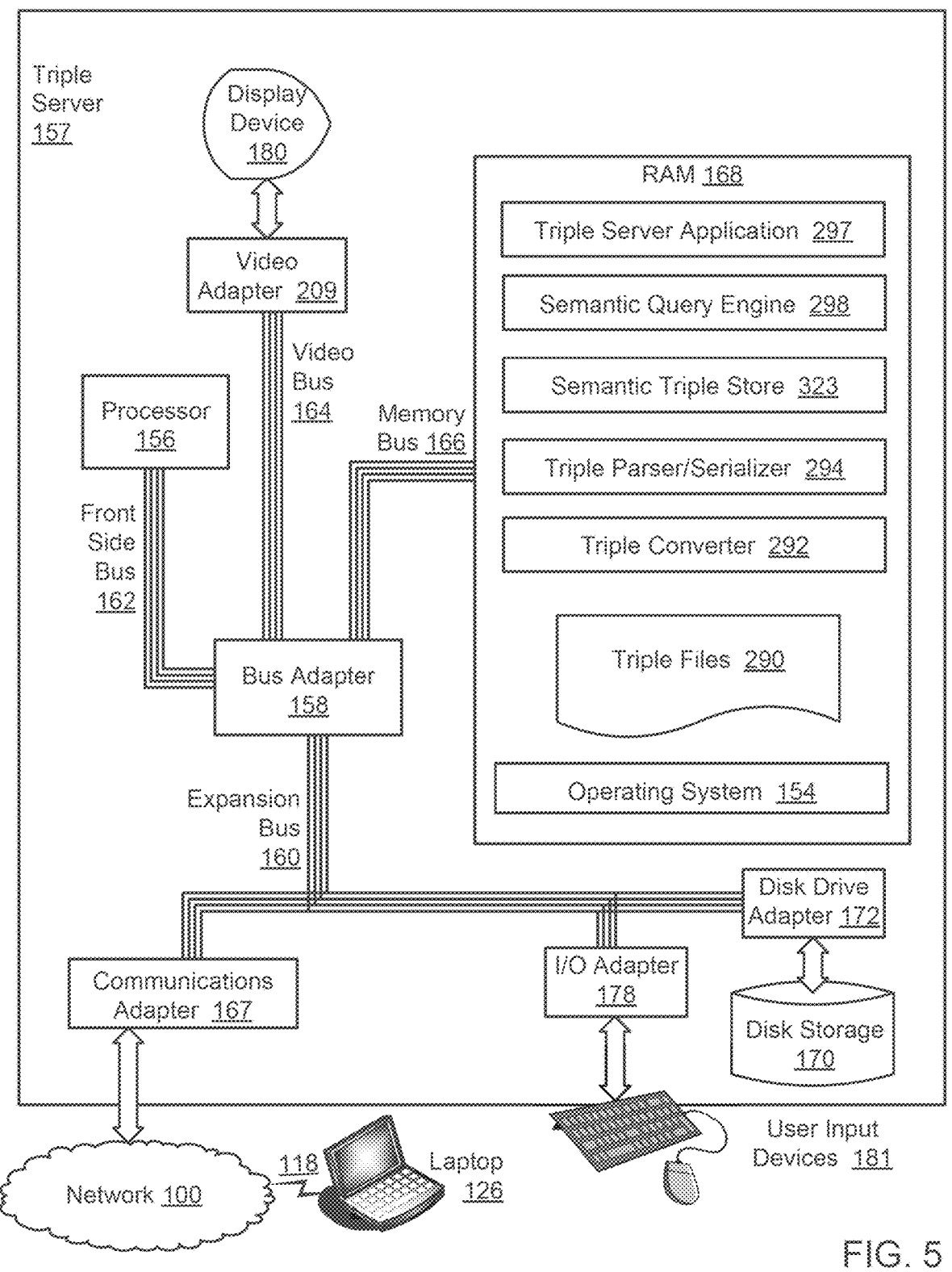
FIG. 5 sets forth a block diagram of automated computing machinery comprising an example of a computer useful as a triple server according to embodiments of the present technology.

For further explanation, FIG. 5 sets forth a block diagram of automated computing machinery comprising an example of a computer useful as a triple server (157) for real-time collateral recommendation for business development representatives ('BDR') according to embodiments of the present technology. The triple server (157) of FIG. 5 includes at least one computer processor (156) or 'CPU' as well as random access memory (168) ('RAM') which is connected through a high-speed memory bus (166) and bus adapter (158) to processor (156) and to other components of the triple server. The processor is connected through a video bus (164) to a video adapter (209) and a computer display (180). The processor is connected through an expansion bus (160) to a communications adapter (167), an I/O adapter (178), and a disk drive adapter (172). The processor is connected to a speech-enabled laptop (126) through data communications network (100) and wireless connection (118). Disposed in RAM is an operating system (154).

Also disposed in RAM are a triple server application program (297), a semantic query engine (298), a semantic triple store (814), a triple parser/serializer (294), a triple converter (292), and one or more triple files (290). The triple server application program (297) accepts, through network (100) from speech-enabled devices such as laptop (126), semantic queries that it passes to the semantic query engine (298) for execution against the triple stores (323, 325).

The triple parser/serializer (294) administers the transfer of triples between triple stores and various forms of disk storage. The triple parser/serializer (294) accepts as inputs the contents of triple stores and serializes them for output as triple files (290), tables, relational database records, spreadsheets, or the like, for long-term storage in non-volatile memory, such as, for example, a hard disk (170). The triple parser/serializer (294) accepts triple files (290) as inputs and outputs parsed triples into triple stores. In many embodiments, when the triple parser/serializer (294) accepts triple files (290) as inputs and outputs parsed triples into triple stores.

Figure 6:
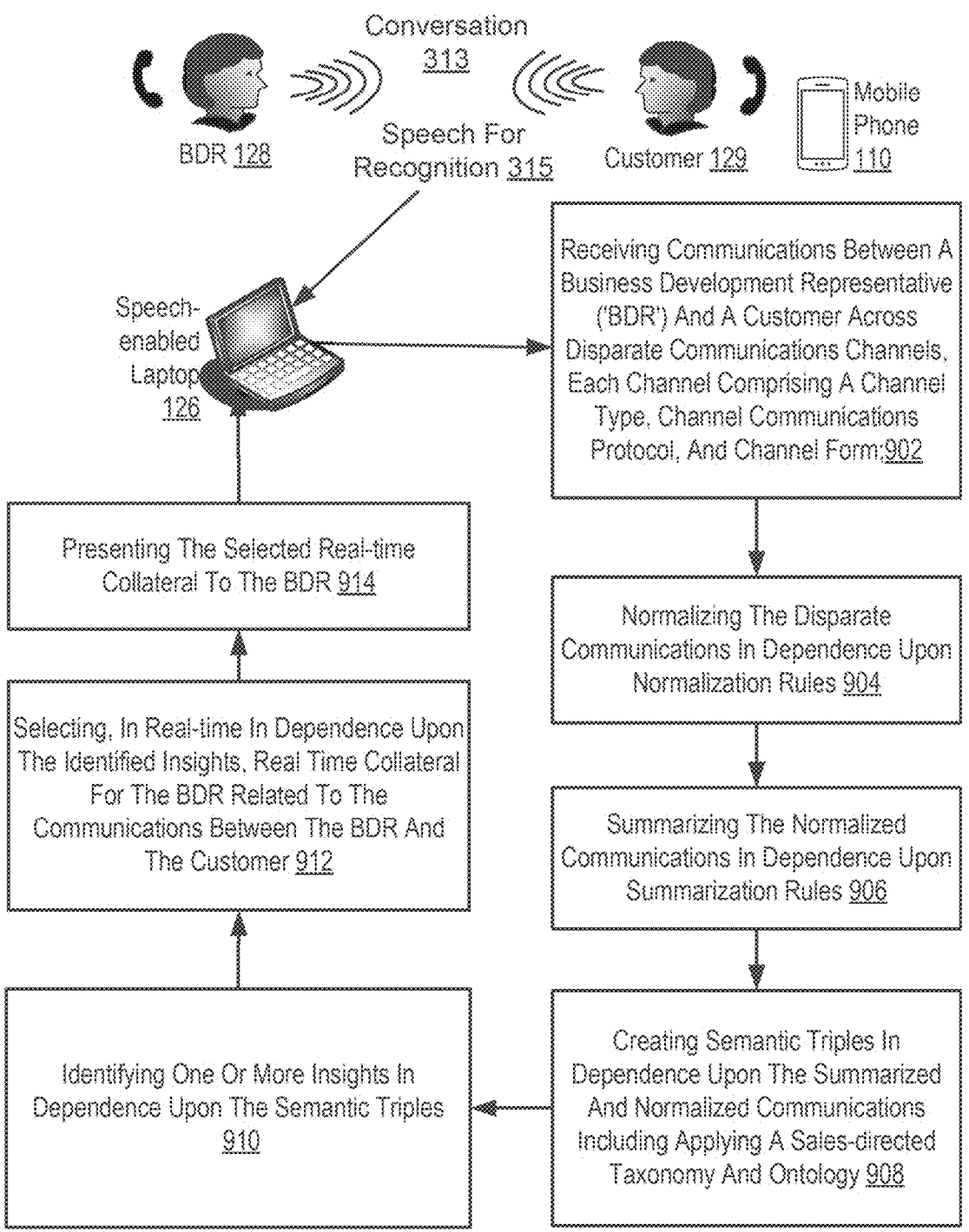
FIG. 6 sets forth a flowchart illustrating an example method of real-time collateral recommendation for business development representatives ('BDR') according to example embodiments of the present technology.

For further explanation, FIG. 6 sets forth a flowchart illustrating an example method of real-time collateral recommendation for business development representatives ('BDR').) The method of FIG. 6 includes receiving (902) communications between a business development representative ('BDR') (128) and a customer (129) across disparate communications channels, each channel comprising a channel type, channel communications protocol, and channel form. In some implementations, receiving (902) communications between a business development representative ('BDR') and a customer across disparate communications channels may include receiving live communications between the BDR and the customer. In some implementations, receiving (902) communications between a business development representative ('BDR') and a customer across disparate communications channels may include receiving recorded communications between the BDR and the customer.

The method of FIG. 6 also includes normalizing (904) the disparate communications in dependence upon normalization rules. Normalizing (904) the disparate communications in dependence upon normalization rules may be carried out by applying rules to text representations of the communications to provide uniformity to text representations of communications of disparate types. Such rules may include converting the text to a uniform font such as all capitalized letters in the same font, applying uniform spacing between words in the text, and removing punctuation from the text.

The method of FIG. 6 also includes summarizing (906) the normalized communications in dependence upon summarization rules. Summarizing (906) the normalized communications may be carried out by reducing the overall content of the communications in a predetermined matter to focus the text of the communications for application of a taxonomy and ontology. In some embodiments, summarization rules may include, for example, removing predetermined adverbs, removing designated first words, adjusting or removing contractions, and replacing known phrases with a standardized language pattern.

The method of FIG. 6 includes creating (908) semantic triples in dependence upon the summarized and normalized communications including applying a sales-directed taxonomy and ontology. The taxonomy (322), e.g., as described above with reference to FIG. 1, includes words or sets of words with defined semantics that will be stored as triples. To parse speech into semantic triples the triple parser receives text converted from speech by the speech engine and identifies portions of that text that correspond with the taxonomy and forms triples using the defined elements of the taxonomy. An ontology, as described with reference to FIG. 1, is a formal specification that provides sharable and reusable knowledge representation, for example, descriptions of concepts and properties in a domain, relationships between concepts, constraints on how the relationships can be used and other concepts and properties.

In some implementations, the collateral may be segmented in a markup language, for example, to facilitate converting the collateral to XML, and then into semantic triples, where the different segments can be stored as searchable triples in the graph database. Each of the generated triples from the collateral can include a reference back to the originating collateral, e.g., in the form of an internal pointer to the database, a link to a document location, a hyperlink to a webpage, etc. Segmenting the collateral may be carried out by identifying one or more sections of the collateral in dependence upon subject matter and assigning each segmented section to one or more identifications by concept, product, industry, customer, location, and other factors. In some implementations, segmenting the collateral can include identifying respective portions of the collateral, for example, header, body, footnotes, etc. The triples can be generated from these segments, e.g., a header triple, a body triple, footnote triple, etc. The collateral can then be queried using the semantic triples generated from the normalized and summarized communication between the BDR and customer.

Representing the segmented collateral in a markup language may be carried out by extracting text of the collateral or converting speech of the collateral to text and assigning markup to the text according to a markup language. A markup language is a system for annotating a document in a way that is visually distinguishable from the content. It is often used to format text. Examples of markup languages include LaTex, GML, HTML, XML etc.

In some implementations, creating (908) semantic triples can include parsing the segmented collateral into semantic triples in dependence upon a collateral taxonomy and storing the semantic triples generated from the segmented collateral in an enterprise knowledge graph of a semantic graph database.

The method of FIG. 6 includes identifying (910) one or more insights in dependence upon the semantic triples. Identifying (910) one or more insights can include extracting semantic triples generated from the segmented collateral and stored in the enterprise knowledge graph of the semantic graph database. Concepts so extracted, in some embodiments, represent the conceptual subject matter of the segmented collateral such that the selected collateral may be presented for use by the BDR in a concise and effective manner. Extracting the semantic triples generated from the segmented collateral can include, for example, querying the graph database using semantic triples generated from the normalized and summarized communication. In other words, semantic triples generated from the communication can be used to query the knowledge graph for semantic triples generated from the collateral, and used to identify collateral that can be used during the conversation between the BDR and customer.

The method of FIG. 6 includes selecting (912), in real-time based on the identified insights, real time collateral for the BDR related to the communications between the BDR and the customer. In some implementations, selecting (912), in real-time based on the identified insights, real time collateral for the BDR related to the communications between the BDR and the customer includes selecting real-time collateral based on post-call notes of the BDR or other BDRs.

The method of FIG. 6 includes presenting (914) the selected real-time collateral to the BDR. Presenting (914) the selected real-time collateral to the BDR may be carried out by displaying the collateral to the BDR through an agent dashboard or other user interface. Presenting (914) the selected real-time collateral to the BDR may be carried out by providing in transmittable form a digital copy of the collateral for transmission to the customer.

Figure 7:
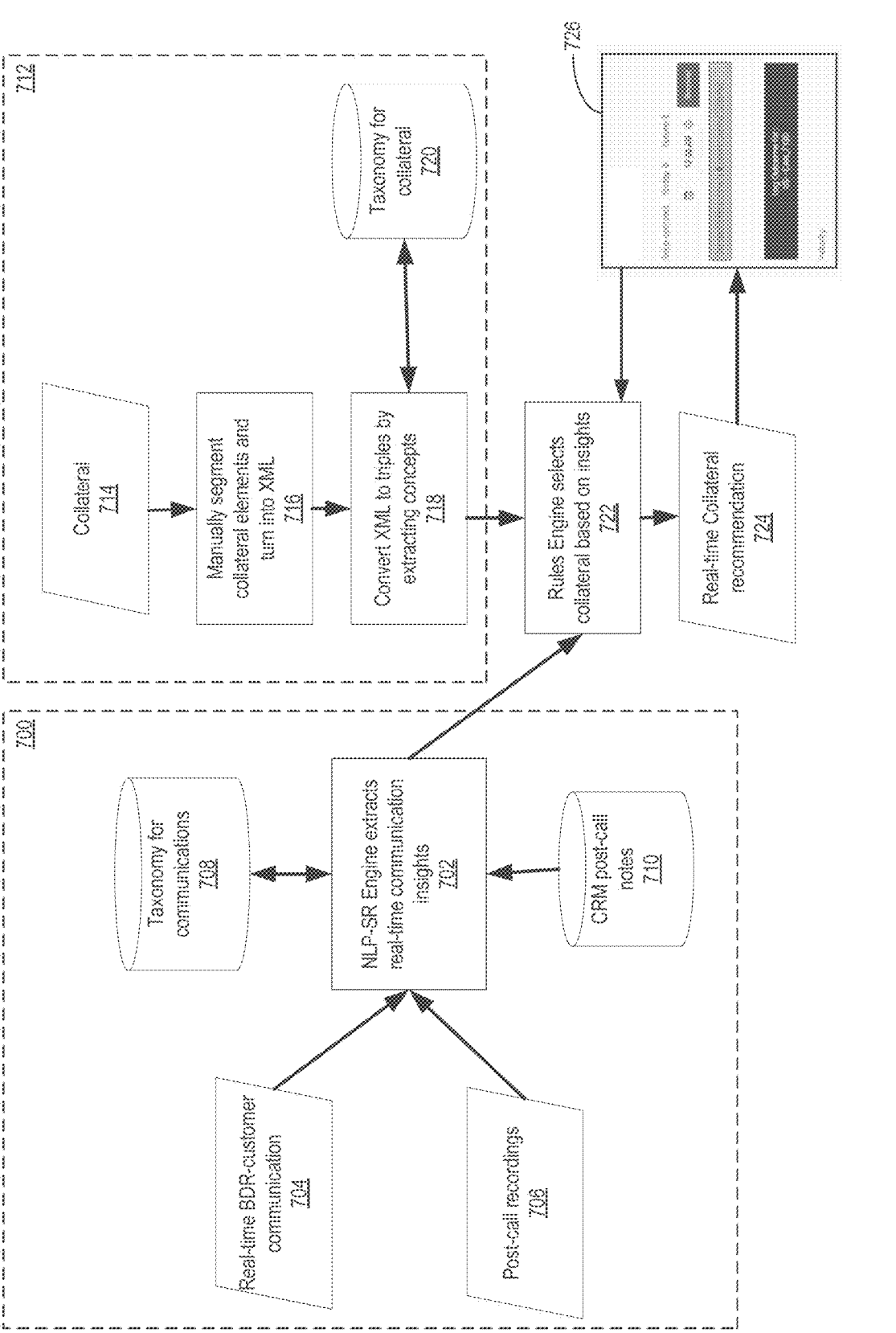
FIG. 7 sets forth a diagram illustrating another example system for real-time collateral recommendation for business development (BDR).

FIG. 7 depicts a flow diagram illustrating a process for providing real-time collateral to a BDR. A subprocess (700) can generate, from real-time BDR-customer communication (704) and/or post-call recordings (706), semantic triples stored in a knowledge graph of a semantic graph database, e.g., as discussed with reference to FIG. 1. An NLP-SR Engine extract real-time communication insights (702) from real-time BDR/customer communications (704) and/or post-call recordings (706) between the BDR and customer and/or the BDR alone. The NLP-SR engine can extract insights by processing the communications using a pre-defined taxonomy for the communications (708) and/or CRM post-call notes (710) generated by the BDR and/or a manager. The NLP-SR can generate, from the processed communications, semantic triples that can be stored in a knowledge graph of a semantic graph database, e.g., as discussed with reference to FIG. 1.

FIG. 7 additionally depicts a sub-process (712) for converting the collateral (714) into semantic triples stored in the knowledge graph of the semantic graph database. The collateral is manually segmented into collateral elements and converted into XML (716). The concepts from the XML segments are extracted and converted into semantic triples (718) using taxonomy for the collateral (720), e.g., by a triple parser and serializer (320) as discussed with reference to FIG. 2.

At times, the intelligence assistant, e.g., intelligence assistant (300), can be used the generated insights to select collateral for the BDR based in part on a rules engine. The rules engine selects collateral based on the generated insights (722). For example, a rules engine can select collateral based on a set of rules defined by a human user, where the rules define collateral responsive to particular insights that are generated based on the communication between the BDR and the customer.

The real-time collateral recommendation can be provided to a BDR (724) through a user interface (726). The user interface can include a dashboard including additional information related to the generated insights and context for the provided collateral recommendation. At times, the rules from the rules engine can be refined based on feedback by BDR(s). For example, a BDR may score a received collateral based on a utility of the collateral in response to the communication between the BDR and customer. The rules engine may update the rules based on the collected scoring and refine the collateral provided in response to the insights. For example, the BDR can provide feedback related to the recommended collateral via the user interface (726).

Figure 8:
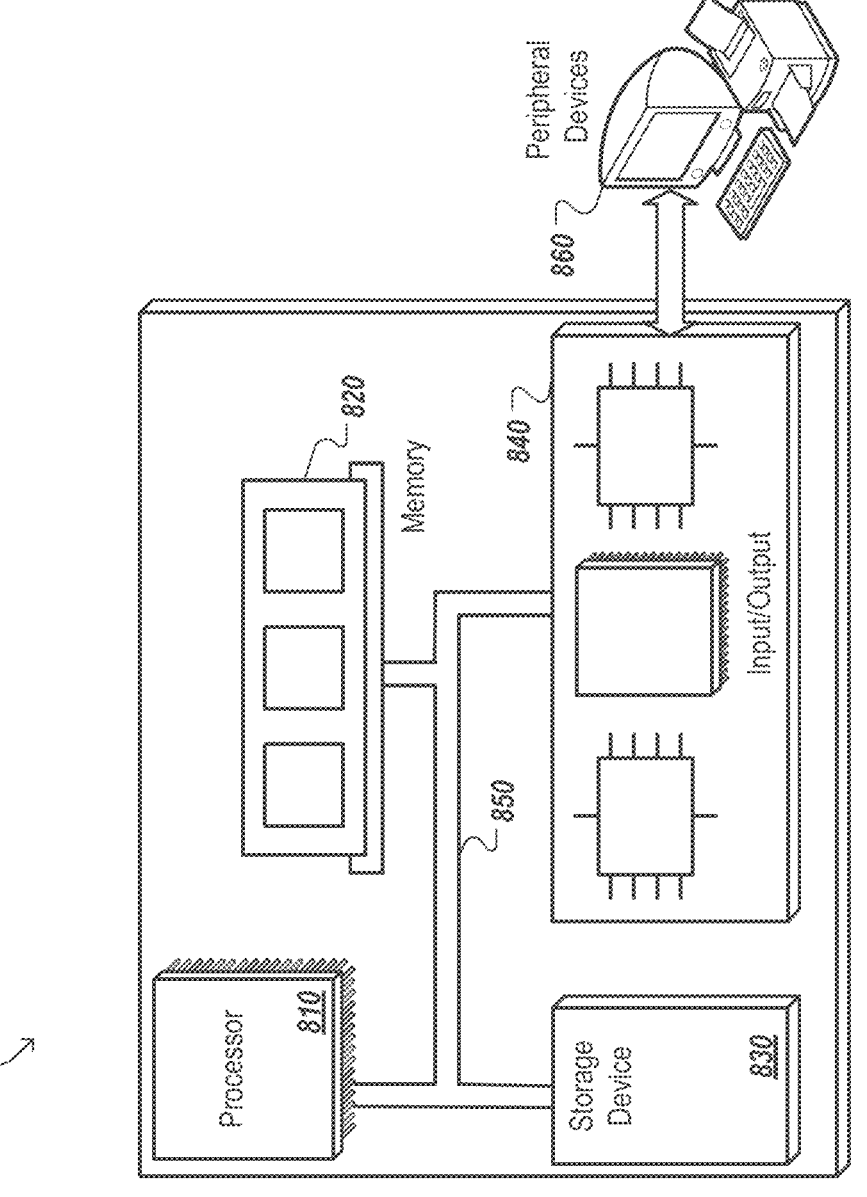
FIG. 8 is a block diagram of an example generic computing system.

FIG. 8 is block diagram of an example computer system 800 that can be used to perform operations described in this specification. For example, engines and/or modules described and/or shown elsewhere in this specification can be executed on a computing and/or mobile device that is substantially similar to the one described in FIG. 8. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can include, for example, a hard disk device, an optical disk device, a storage device that is shared over a network by multiple computing devices (e.g., a cloud storage device), or some other large capacity storage device.

The input/output device 840 provides input/output operations for the system 800. In one implementation, the input/output device 840 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 860, e.g., keyboard, printer and display devices. Other implementations, can also be used, such as mobile computing devices, mobile communication devices, set-top box television client devices, etc.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

It will be understood from the foregoing description that modifications and changes may be made in various embodiments without departing from its true spirit. The descriptions in this specification are for purposes of illustration only and are not to be construed in a limiting sense.

The subject matter and the actions and operations described in this specification can be implemented in digital electronic circuitry, in tangibly-embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. Alternatively, or in addition, the carrier can be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random-access memory or both. The elements of a computer include a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid-state drives. In some implementations, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, the subject matter described in this specification can be implemented on one or more computers having, or configured to communicate with, a display device, e.g., a LCD (liquid crystal display) monitor, or a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

The subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML, page, to a user device, e.g., for purposes of displaying data to and receiving user input from a user interacting with the device, which acts as a client. Data generated at the user device, e.g., a result of the user interaction, can be received at the server from the device.

What is claimed is:

1. A method of real-time multimedia content recommendation using a voice server during communication between one or more of speech-enabled devices supporting an intelligence assistance and one or more of user devices, the method comprising:

electrically receiving communications, by the voice server, between a speech-enabled device and a user device-across disparate communications channels, each channel comprising a channel type, channel communications protocol, and channel form, wherein the voice server includes at least one computer processor and a memory which is connected through a high-speed memory bus and a bus adapter to the at least one computer processor, and wherein the electrically receiving communication comprises:

accepting, by the speech-enabled device, speech from a user;

recognizing, by the speech-enabled device, the speech from the user, wherein recognizing the speech includes converting, at least one of real-time speech contributions and recorded speech contributions of the communications, to text by performing a natural language processing and automatic speech recognition (NLP-ASR); and expressing, by the speech-enabled device, voice prompts and speech responses to the user;

electrically normalizing, by the voice server, the disparate communications in dependence upon normalization rules;

electrically automatically synchronizing, by the voice server, the at least one of real-time speech contributions and recorded speech contributions of the communications across disparate communications channels in dependence upon a set of rules appropriate to the end task including an occurrence of the disparate channel communication in time order;

electrically summarizing, by the voice server, the normalized communications in dependence upon summarization rules;

electrically creating, by the voice server, semantic triples in dependence upon the summarized and normalized communications, between the one or more of speech-enabled devices supporting the intelligence assistance and the one or more of user devices, wherein electrically creating the semantic triples further comprises:

applying a multimedia content-specific taxonomy and ontology;

receiving the text converted from the at least one of real-time speech contributions and recorded speech contributions of the communications; and segmenting the text by identifying portions of the text corresponding to the multimedia content-specific taxonomy and ontology to assign one or more identifications to each identified portion of the text; and storing the segmented and identified portions of the text as searchable semantic triples in a semantic graph database, wherein each searchable semantic triple comprises an internal pointer to an originating multimedia content database, a link to a document location, and a hyperlink to a webpage to reference back to the originating multimedia content;

electrically identifying, by querying the semantic graph database using the voice server, one or more insights in dependence upon the searchable semantic triples generated and stored in the semantic graph database based on the normalized and summarized communications;

electrically selecting, by the voice server, in real-time in dependence upon the identified insights, real-time multimedia content related to the communications between the speech-enabled device and the user device, wherein selecting the real-time multimedia content comprises:

pre-processing, using the multi-media content-specific taxonomy and ontology, the multimedia content to generate semantic triples specific to the multimedia content;

generating a repository of the pre-processed multimedia content, accessible by the intelligence assistance, to provide relevant multimedia content to the speech-enabled device;

generating, based on the repository, an enterprise knowledge graph of the semantic graph database by storing multimedia-based semantic triples;

receiving, using a query based on the semantic triples in dependence upon the summarized and normalized communications, a candidate multimedia content from the enterprise knowledge graph of multimedia-based semantics; and selecting, based on the received candidate multimedia content, the real-time multimedia content during communications between the speech-enabled device and the user device; and electrically presenting, by the voice server, the selected real-time multimedia content to the speech-enabled device, wherein presenting the selected real-time multimedia content comprises:

displaying the selected multimedia content to the one or more devices via an agent dashboard or a user interface; and providing a digital copy of the selected multimedia content in transmittable form to the one or more users.

2. The method of claim 1, further comprising segmenting candidate multimedia content and representing the segmented candidate multimedia content in a markup language.

3. The method of claim 2, wherein further comprising parsing the segmented candidate multimedia content into another set of semantic triples and storing the another set of semantic triples in the enterprise knowledge graph of the semantic graph database.

4. The method of claim 3, wherein the segmented candidate multimedia content is parsed into the another set of semantic triples in dependence upon a multimedia content taxonomy.

5. The method of claim 3, wherein identifying the one or more insights further comprises extracting concepts from the segmented candidate multimedia content in dependence upon the another set of semantic triples stored in the enterprise knowledge graph of the semantic graph database.

6. The method of claim 1, wherein receiving the communications between the speech-enabled device and the user device across the disparate communications channels includes receiving one of: live communications between the speech-enabled device and the user device, or recorded communications between the speech-enabled device and the user device.

7. The method of claim 1, wherein selecting the real time multimedia content for the speech-enabled device includes selecting real-time multimedia content in dependence of post-communication analytics of the speech-enabled device or other speech-enabled devices.

8. A system of real-time multimedia content recommendation using a voice server during communication between one or more of speech-enabled devices supporting an intelligence assistance and one or more of user device associated with a user, the system comprising automated computing machinery configured for:

electrically receiving communications, by the voice server, between a speech-enabled device and a user device across disparate communications channels, each channel comprising a channel type, channel communications protocol, and channel form, wherein the voice server includes at least one computer processor and a memory which is connected through a high-speed memory bus and a bus adapter to at least one computer processor, and wherein the electrically receiving communication comprises:

accepting, by the speech-enabled device, speech from a user;

recognizing, by the speech-enabled device, the speech from the user, wherein recognizing the speech includes converting at least one of real-time speech contributions and recorded speech contributions of the communications, to text by performing a natural language processing and automatic speech recognition (NLP-ASR); and expressing, by the speech-enabled device, voice prompts and speech responses to the user;

electrically normalizing, by the voice server, the disparate communications in dependence upon normalization rules;

electrically automatically synchronizing, by the voice server, the at least one of real-time speech contributions and recorded speech contributions of the communications across disparate communications channels in dependence upon a set of rules appropriate to the end task including an occurrence of the disparate channel communications in time order;

electrically summarizing, by the voice server, the normalized communications in dependence upon summarization rules;

electrically creating, by the voice server, semantic triples in dependence upon the summarized and normalized communications, between the one or more of speech-enabled devices supporting the intelligence assistance and the one or more of user devices, wherein creating the semantic triples further comprises:

applying a multimedia content-specific taxonomy and ontology;

receiving the text converted from the at least one of real-time speech contributions and recorded speech contributions of the communications; and segmenting the text by identifying portions of the text corresponding to the multimedia content-specific taxonomy and ontology to assign one or more identifications to each identified portion of the text; and storing the segmented and identified portions of the text as searchable semantic triples in a semantic graph database, wherein each searchable semantic triple comprises an internal pointer to an originating multimedia content database, a link to a document location, and a hyperlink to a webpage to reference back to the originating multimedia content;

electrically identifying, by querying the semantic graph database using the voice server, one or more insights in dependence upon the searchable semantic triples generated and stored in the semantic graph database based on the normalized and summarized communications;

electrically selecting, by the voice server, in real-time in dependence upon the identified insights, real-time multimedia content for the speech-enabled device related to the communications between the speech-enabled device and the user device, wherein selecting the real-time multimedia content comprises:

pre-processing, using the multi-media content-specific taxonomy and ontology, the multimedia content to generate semantic triples specific to the multimedia content;

generating a repository of the pre-processed multimedia content, accessible by the intelligence assistance, to provide relevant multimedia content to the speech-enabled device;

generating, based on the repository, an enterprise knowledge graph of a semantic graph database by storing multimedia-based semantic triples;

receiving, using a query based on the semantic triples in dependence upon the summarized and normalized communications, a candidate multimedia content from the enterprise knowledge graph of multimedia-based semantics; and selecting, based on the received candidate multimedia content, the real-time multimedia content during communications between the speech-enabled device and the user device; and electrically presenting, by the voice server, the selected real-time multimedia content to the speech-enabled device, wherein presenting the selected real-time multimedia content comprises:

displaying the selected real-time multimedia content to the one or more devices via an agent dashboard or a user interface; and providing a digital copy of the selected multimedia content in transmittable form to the one or more users.

9. The system of claim 8, further comprising segmenting a candidate multimedia content and representing the segmented candidate multimedia content in a markup language.

10. The system of claim 9, further comprising parsing the segmented candidate multimedia content into another set of semantic triples and storing the another set of semantic triples in an enterprise knowledge graph of a semantic graph database.

11. The system of claim 9, wherein identifying one or more insights further comprises extracting concepts from the segmented multimedia content in dependence upon the semantic triples stored in the enterprise knowledge graph of the semantic graph database.

12. The system of claim 8, wherein receiving communications between the speech-enabled device and the user device across disparate communications channels includes receiving live communications between the speech-enabled device and the user device.

13. The system of claim 8, wherein receiving communications between the speech-enabled device and the user device across disparate communications channels includes receiving recorded communications between the speech-enabled device and the user device.

14. The system of claim 8, wherein selecting the real time multimedia content for the speech-enabled device includes selecting real-time multimedia content in dependence of post-communication analytics of the speech-enabled device or other speech-enabled devices.

15. A non-transitory computer readable medium for real-time multimedia content recommendation using a voice server for communication between one or more of speech-enabled devices supporting an intelligence assistance and one or more of user devices associated with a user, the product comprising one or more non-transitory computer-readable media including instructions that, when executed, by a computer, perform the steps comprising:

electrically receiving communications, by the voice server, between a speech-enabled device and a user device across disparate communications channels, each channel comprising a channel type, channel communications protocol, and channel form, wherein the voice server includes at least one computer processor and a memory which is connected through a high-speed memory bus and a bus adapter to the at least one computer processor, wherein electrically receiving communication comprises:

accepting, by the speech-enabled device, speech from a user;

recognizing, by the speech-enabled device, the speech from the user, wherein recognizing the speech includes converting at least one of real-time speech contributions and recorded speech contributions of the communications, to text by performing a natural language processing and automatic speech recognition (NLP-ASR); and expressing, by the speech-enabled device, voice prompts and speech responses to the user;

normalizing the disparate communications in dependence upon normalization rules;

electrically automatically synchronizing, by the voice server, the at least one of real-time speech contributions and recorded speech contributions of the communications across disparate communications channels in dependence upon a set of rules appropriate to the end task including an occurrence of the disparate communications in time order;

electrically summarizing, by the voice server, the normalized communications in dependence upon summarization rules;

electrically creating, by the voice server, semantic triples in dependence upon the summarized and normalized communications, between the one or more of speech-enabled devices supporting the intelligence assistance and the one or more of user devices, wherein creating the semantic triples further comprises:

applying a multimedia content-specific taxonomy and ontology;

receiving the text converted from the at least one of real-time speech contributions and recorded speech contributions of the communications; and segmenting the text by identifying portions of the text corresponding to the multimedia content-specific taxonomy and ontology to assign one or more identifications to each identified portion of the text; and storing the segmented and identified portions of the text as searchable semantic triples in a semantic graph database, wherein each searchable semantic triple comprises an internal pointer to an originating multimedia content database, a link to a document location, and a hyperlink to a webpage to reference back to the originating multimedia content;

electrically identifying, by querying the semantic graph database using the voice server, one or more insights in dependence upon the searchable semantic triples generated and stored in the semantic graph database based on the normalized and summarized communications;

electrically selecting, by the voice server, in real-time in dependence upon the identified insights, real-time multimedia content for the speech-enabled device related to the communications between the speech-enabled device and the user device, wherein selecting the real-time multimedia content comprises:

pre-processing, using the multi-media content-specific taxonomy and ontology, the multimedia content to generate semantic triples specific to the multimedia content;

generating a repository of the pre-processed multimedia content, accessible by the intelligence assistance, to provide relevant multimedia content to the speech-enabled device;

generating, based on the repository, an enterprise knowledge graph of the semantic graph database by storing multimedia-based semantic triples;

receiving, using a query based on the semantic triples in dependence upon the summarized and normalized communications, a candidate multimedia content from the enterprise knowledge graph of multimedia-based semantics; and selecting, based on the received candidate multimedia content, the real-time multimedia content during communications between the speech-enabled device and the user device; and electrically presenting, by the voice server, the selected real-time multimedia content to the speech-enabled device, wherein presenting the selected real-time multimedia content comprises:

displaying the selected real-time multimedia content to the one or more devices via an agent dashboard or a user interface; and providing a digital copy of the selected multimedia content in transmittable form to the one or more users.

16. The non-transitory computer readable medium of claim 15, further comprising segmenting a candidate multimedia content and representing the segmented candidate multimedia content in a markup language.

17. The non-transitory computer readable medium of claim 16, further comprising parsing the segmented candidate multimedia content into semantic triples and storing the semantic triples in an enterprise knowledge graph of a semantic graph database.

18. The non-transitory computer readable medium of claim 15, wherein creating semantic triples further comprises parsing the segmented candidate multimedia content into another set of semantic triples and storing the another set of semantic triples in the enterprise knowledge graph of the semantic graph database.

* * * * *